US012495044B2

(12) United States Patent
Attarwala et al.

(10) Patent No.: US 12,495,044 B2
(45) Date of Patent: Dec. 9, 2025

(54) UNIFIED IDENTITY PLATFORM FOR MULTIPLE CLOUD SERVICES

(71) Applicant: Zscaler, Inc., San Jose, CA (US)

(72) Inventors: Murtuza Attarwala, Sunnyvale, CA (US); Alice Wang, Burnaby (CA); Siva Udupa, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 147 days.

(21) Appl. No.: 18/494,125

(22) Filed: Oct. 25, 2023

(65) Prior Publication Data

US 2024/0422161 A1   Dec. 19, 2024

Related U.S. Application Data

(60) Provisional application No. 63/508,058, filed on Jun. 14, 2023.

(51) Int. Cl.
*H04L 9/40* (2022.01)

(52) U.S. Cl.
CPC ........ *H04L 63/102* (2013.01); *H04L 63/0815* (2013.01); *H04L 63/0823* (2013.01); *H04L 63/0884* (2013.01)

(58) Field of Classification Search
CPC ............... H04L 63/102; H04L 63/0815; H04L 63/0823; H04L 63/0884
See application file for complete search history.

(56) References Cited

U.S. PATENT DOCUMENTS

| | | | |
|---|---|---|---|
| 7,023,793 | B2 | 4/2006 | Khambatkone et al. |
| 7,283,462 | B1 | 10/2007 | Attarwala et al. |
| 8,576,841 | B2 | 11/2013 | Ramaraj et al. |
| 8,873,554 | B2 | 10/2014 | Baban et al. |
| 8,948,174 | B2 | 2/2015 | Szyszko et al. |
| 8,949,413 | B2 | 2/2015 | Ramaraj et al. |
| 9,912,600 | B1 | 3/2018 | Attarwala et al. |
| 10,412,122 | B1 | 9/2019 | Olofsson et al. |
| 11,201,817 | B2 | 12/2021 | Aranha et al. |
| 11,509,639 | B2 | 11/2022 | Kariyanahalli et al. |
| 11,658,898 | B2 | 5/2023 | Shah et al. |
| 2007/0297326 | A1 | 12/2007 | Attarwala et al. |
| 2008/0130677 | A1 | 6/2008 | Attarwala et al. |

(Continued)

FOREIGN PATENT DOCUMENTS

| | | |
|---|---|---|
| CA | 3 063 088 C | 11/2018 |
| CA | 3 063 179 S1 | 11/2018 |
| EP | 3 662 647 B1 | 10/2022 |

*Primary Examiner* — Amie C. Lin
(74) *Attorney, Agent, or Firm* — Baratta Law PLLC; Lawrence A. Baratta, Jr.

(57) ABSTRACT

Systems and methods for providing identity services are provided. A method, according to one implementation, includes a step of assuming unified and centralized responsibility for performing identity-related services for a plurality of network security products. In response to an end user device attempting to initiate a session with a selected network security product of the plurality of network security products, the method may perform the identity-related services to manage or authenticate an identity of the end user device or a user of the end user device. Then, the method includes a step of enabling the end user device to establish the session with or receive a service from the selected network security product after performing the identity-related services.

20 Claims, 24 Drawing Sheets

(56) References Cited

U.S. PATENT DOCUMENTS

| | | | |
|---|---|---|---|
| 2011/0228793 A1 | 9/2011 | Bajaj et al. | |
| 2011/0268115 A1 | 11/2011 | Attarwala et al. | |
| 2018/0145984 A1* | 5/2018 | Duggal | H04L 63/0281 |
| 2019/0036770 A1 | 1/2019 | Bhau et al. | |
| 2019/0036814 A1 | 1/2019 | Aranha et al. | |
| 2019/0036842 A1 | 1/2019 | Aranha et al. | |
| 2019/0342283 A1* | 11/2019 | Newell | H04L 9/30 |
| 2020/0112495 A1 | 4/2020 | Attarwala et al. | |
| 2022/0286447 A1* | 9/2022 | Barton | H04L 63/0823 |
| 2022/0374599 A1 | 11/2022 | Deshmukh et al. | |
| 2023/0094339 A1 | 3/2023 | Shah et al. | |

* cited by examiner

740

750

UNIFIED IDENTITY PLATFORM FOR MULTIPLE CLOUD SERVICES

CROSS-REFERENCE TO RELATED APPLICATION

The present application claims the benefit of priority to App. No. 63/508,058, filed Jun. 14, 2023, entitled "Unified identity platform for multiple cloud services," the contents of which are incorporated by reference herein.

TECHNICAL FIELD

The present disclosure generally relates to computer networking systems and methods. More particularly, the present disclosure relates to systems and methods for a unified identity platform for multiple cloud services.

BACKGROUND

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

BRIEF SUMMARY

The present disclosure is directed to systems and methods for providing "identity-related" services in a network in which security products are used. Instead of requiring each security product to use its own identity services, a unified and centralized server can be used as a gateway before the various security products are used to provide network security for users and end user devices on the network.

According to one implementation, a method is configured for executing a unified identification procedure. For example, the method may include the step of assuming unified and centralized responsibility for performing identity-related services for a plurality of network security products. In response to an end user device attempting to initiate a session with a selected network security product of the plurality of network security products, the method further includes the step of performing the identity-related services to manage or authenticate an identity of the end user device or a user of the end user device. Also, the method includes the step of enabling the end user device to establish the session with or receive a service from the selected network security product after performing the identity-related services.

In some implementations, by assuming unified and centralized responsibility for performing the identity-related services for the plurality of network security products, the method can avoid duplication of the identity-related services by the plurality of network security products. When the method is implemented in an IdP system, the IdP system may be related to a cloud-based system oriented between the end user device and the Internet. The method may further include the step of instituting a Single Sign-On (SSO) procedure for accessing the plurality of network security products, wherein the SSO may be associated with a single portal or User Interface (UI) of a server or Identity Provider (IdP) allowing a user to navigate the plurality of network security products.

The step of managing or authenticating the identity of the end user device or user may include support of authentication processes associated with one or more of Security Assertion Markup Language (SAML), OAuth 1.0, OAuth 2.0, and OpenID Connect, a System for Cross-domain Identity Management (SCIM), a system that spans multiple data centers, a Lightweight Directory Access Protocol (LDAP), an Active Directory (AD), and an authentication bridge service.

The method, in some embodiments, may include the use of one or more of a metadata manager, an organization configuration manager, a provisioning manager, and a notification manager. Also, the method may utilize a database configured to store or log ID information related to one or more user IDs, device IDs, and authentication attempts. The method may also include the use of an inbound authentication unit, an authentication manager, and an outbound federated authentication unit, which may be configured in combination to perform the identity-related services. In addition, the method 760 may further use an inbound provisioning unit, a provisioning manager, and an outbound provisioning unit, which may be configured in combination to manage identity-related messaging with the plurality of network security products.

In some embodiments of the present disclosure, the method may additionally include the step of allowing a server to act as a Certificate Authority and perform a task of synchronizing a mobile portal to an ID store. The method may also be configured to perform the step of protecting applications associated with a Cloud Access Security Broker (CASB).

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 4 is a block diagram of a user device, which may be used with the cloud-based system or the like.

DETAILED DESCRIPTION

The present disclosure relates to systems and methods for providing "identity-related" services for one or more separate network security products. The systems and methods of the present disclosure may be considered to be based on a unified and centralized identity platform for multiple cloud services. The identity platform or identity framework of the various embodiments of the present disclosure may be configured to assume or assert unified and/or centralized responsibility for performing these identity-related services for a plurality of network security products, thus removing the responsibility from the various security products that may be configured to focus on other types of services. In response to an end user device attempting to initiate a session with one of the network security products, the identity platform can perform the specific identity-related services to manage or authenticate an identity of the end user device or a user of the end user device. After this, the end user device can then establish the session with or receive a service from the selected network security product.

Example Cloud-Based System Architecture

Figure 1A:
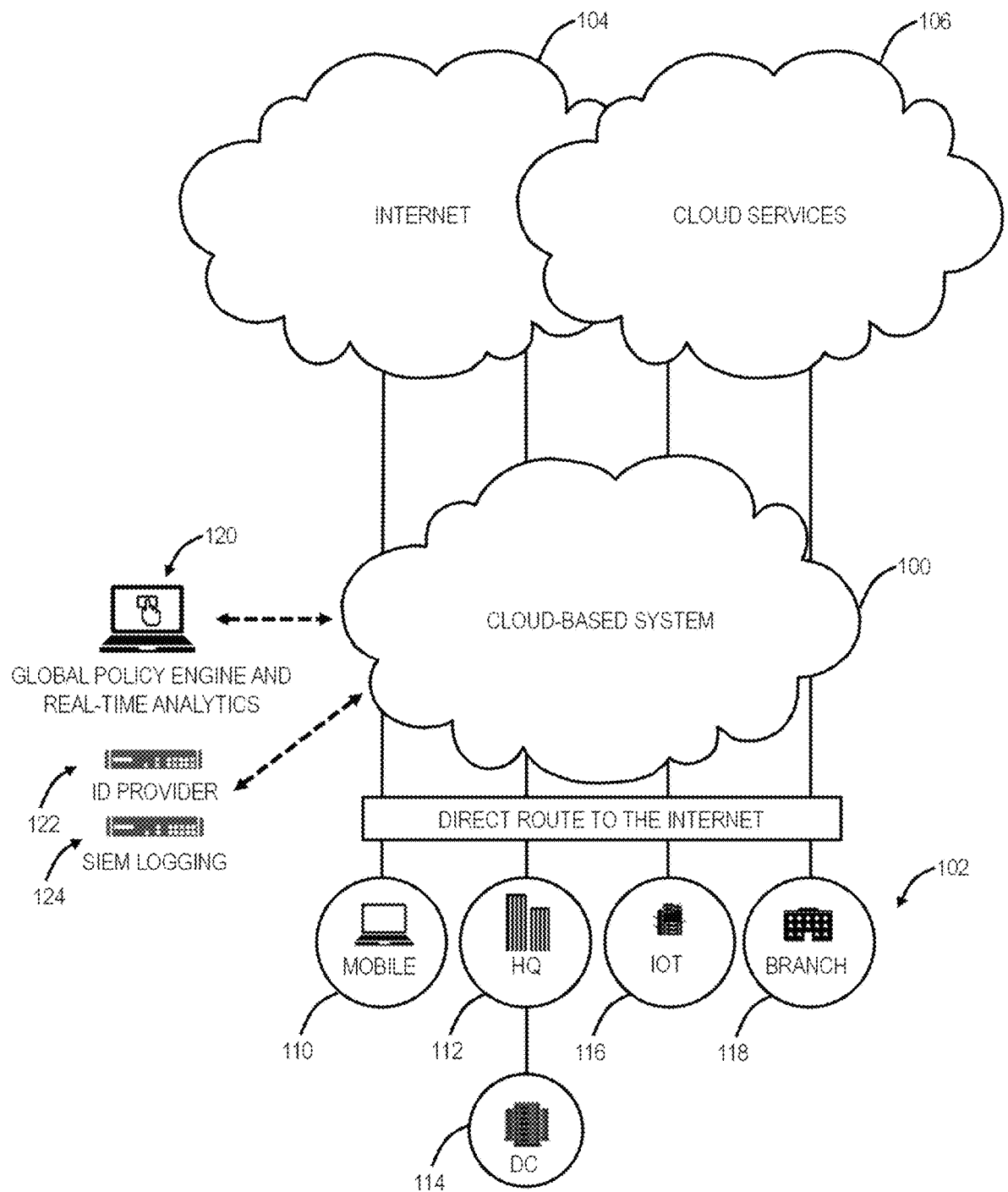
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
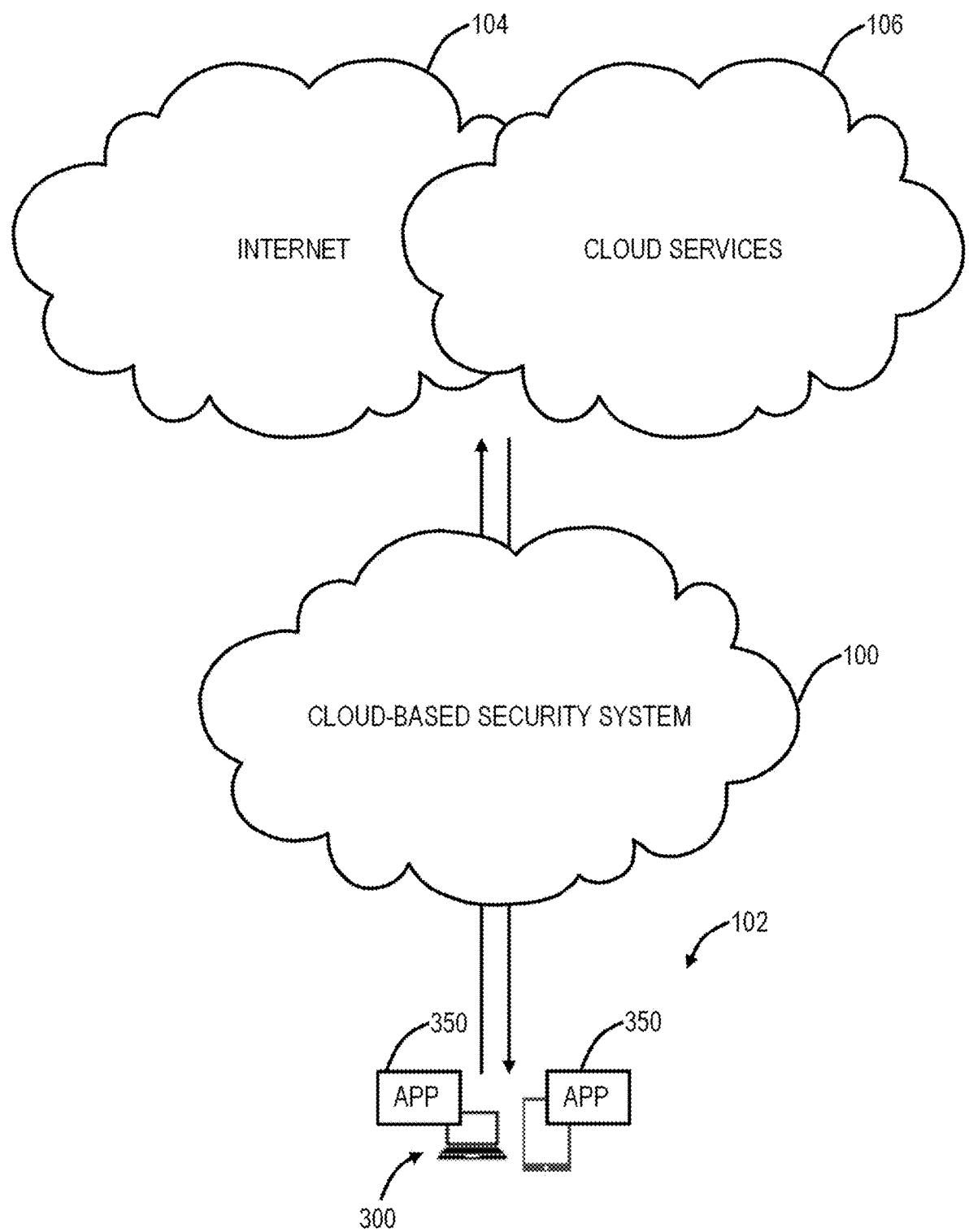
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
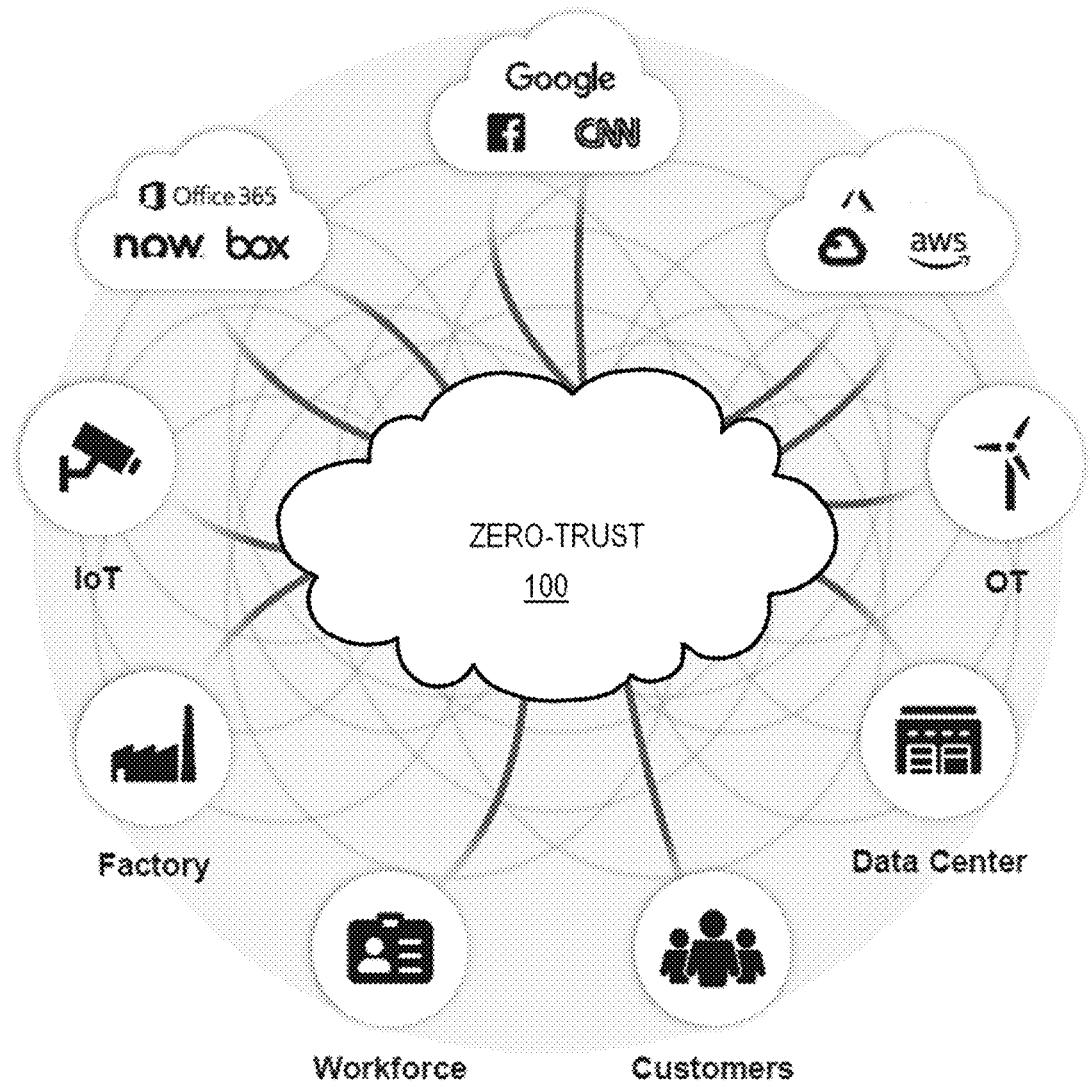
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:
1) Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.
2) Protect data using granular context-based policies: Zero trust policies verify access requests and rights based on context, including user identity, device, location, type of content, and the application being requested. Policies are adaptive, so user access privileges are continually reassessed as context changes.
3) Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
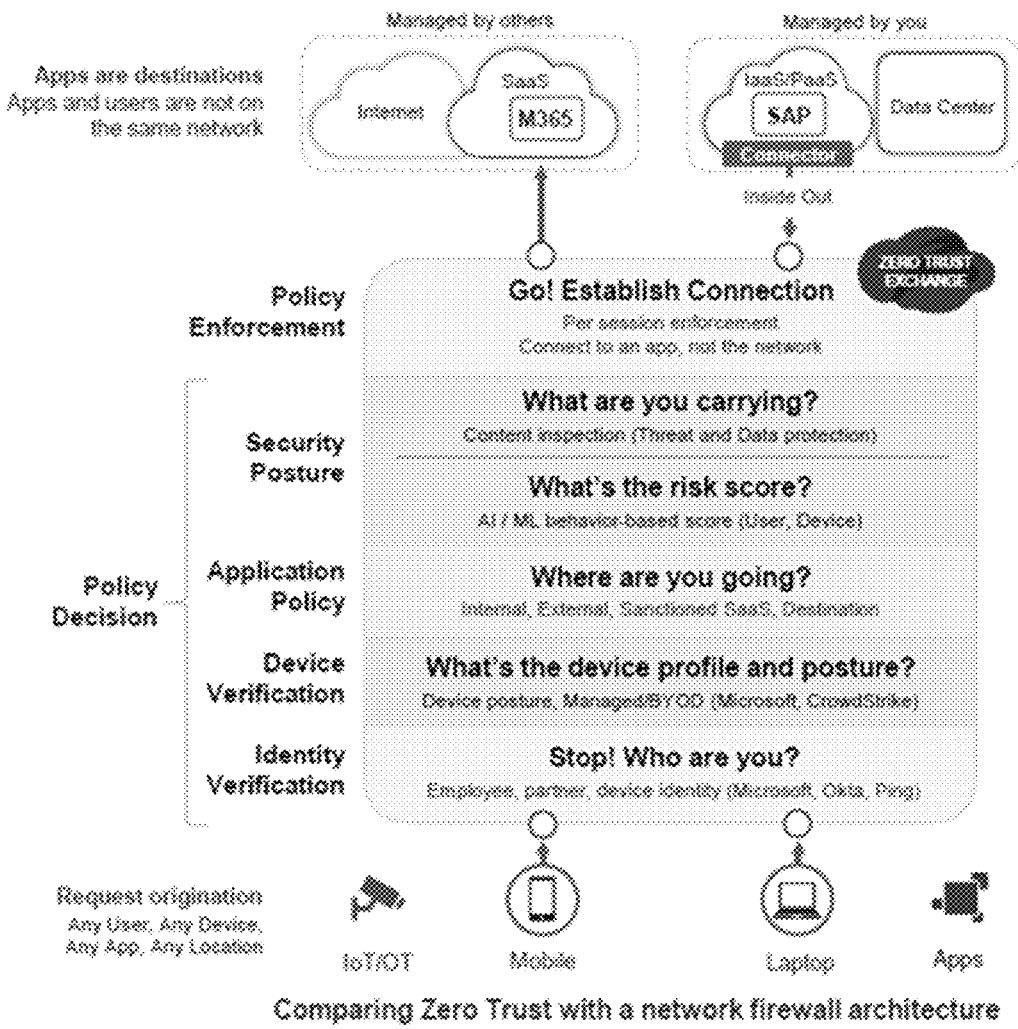
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
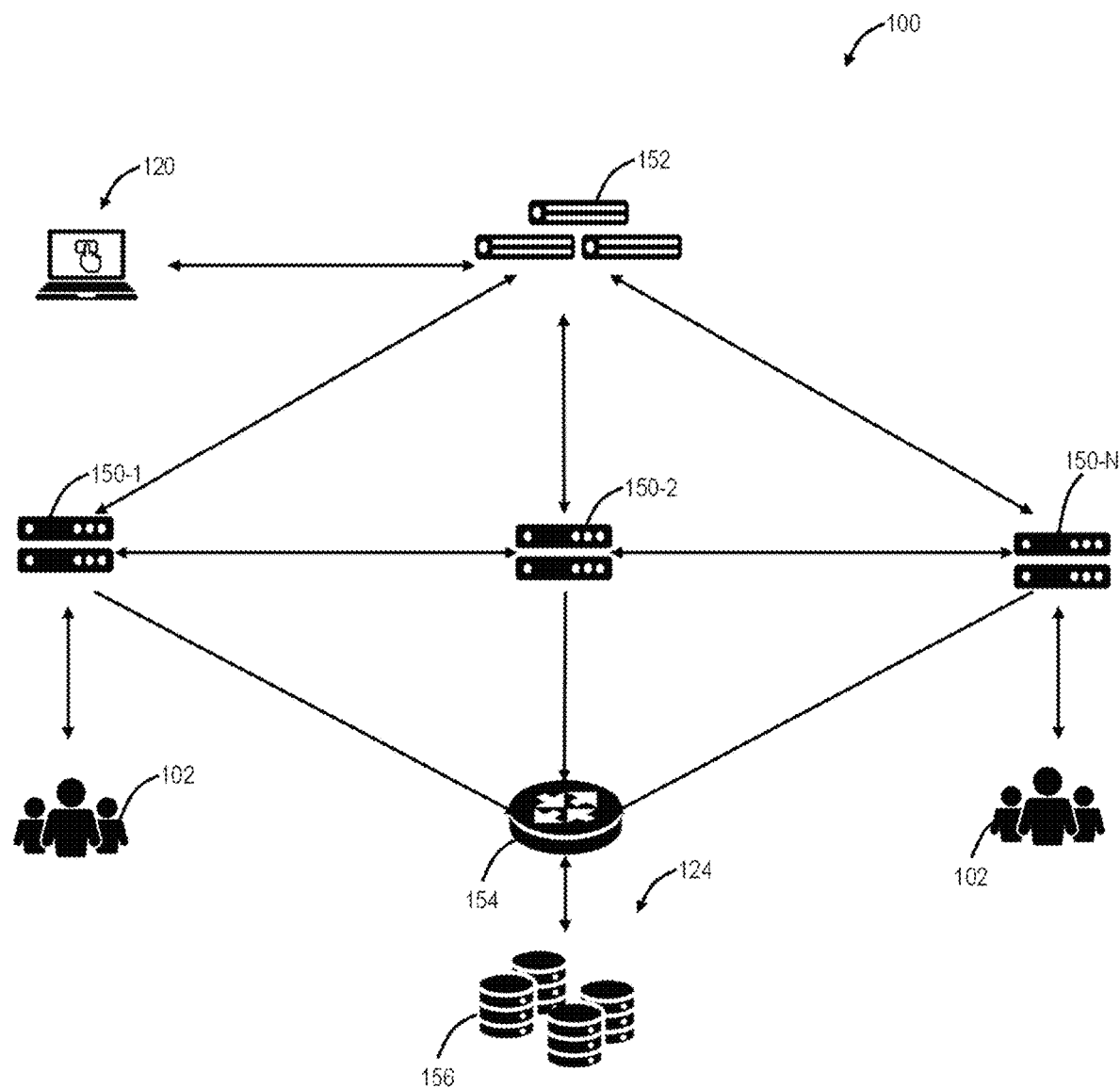
FIG. 2 is a network diagram of an example implementation of the cloud-based system.
Figure 4:
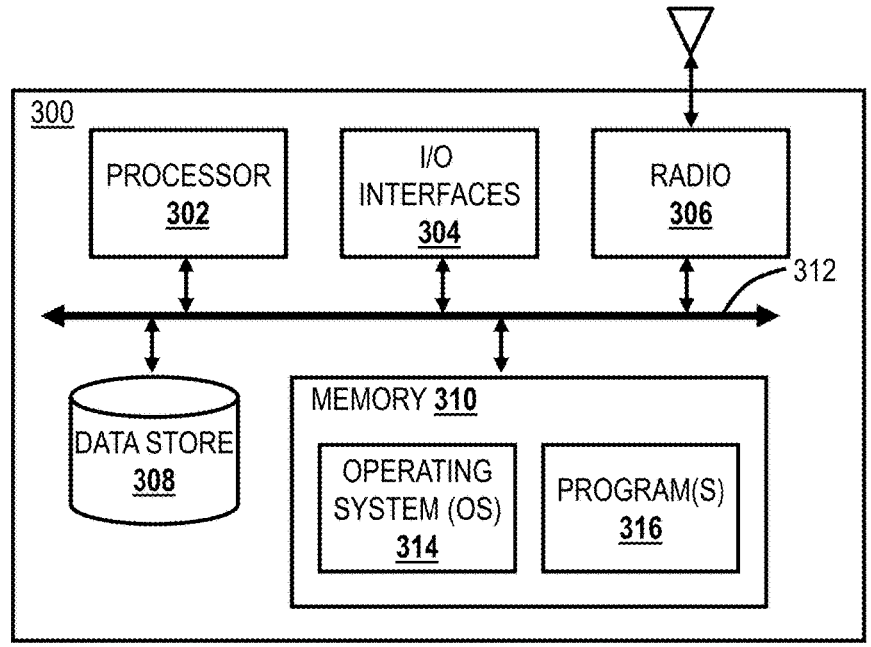

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d_1, d_2, \ldots, d_n]$ for a content item of one or more parts $C=[c_1, c_2, \ldots, c_m]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c_1, c_2, \ldots, c_m]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices.

The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Posture Control (ZPC), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
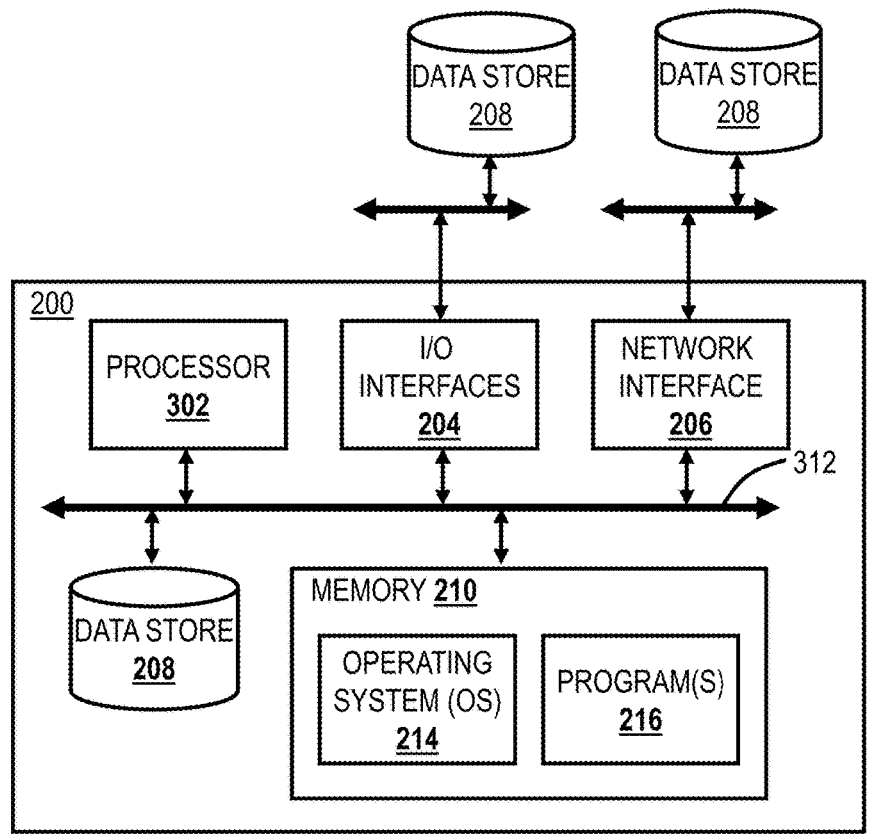
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 2.0 User Device Application for Traffic Forwarding and Monitoring

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 5.0 Zero Trust Network Access Using the Cloud-Based System

Figure 6:
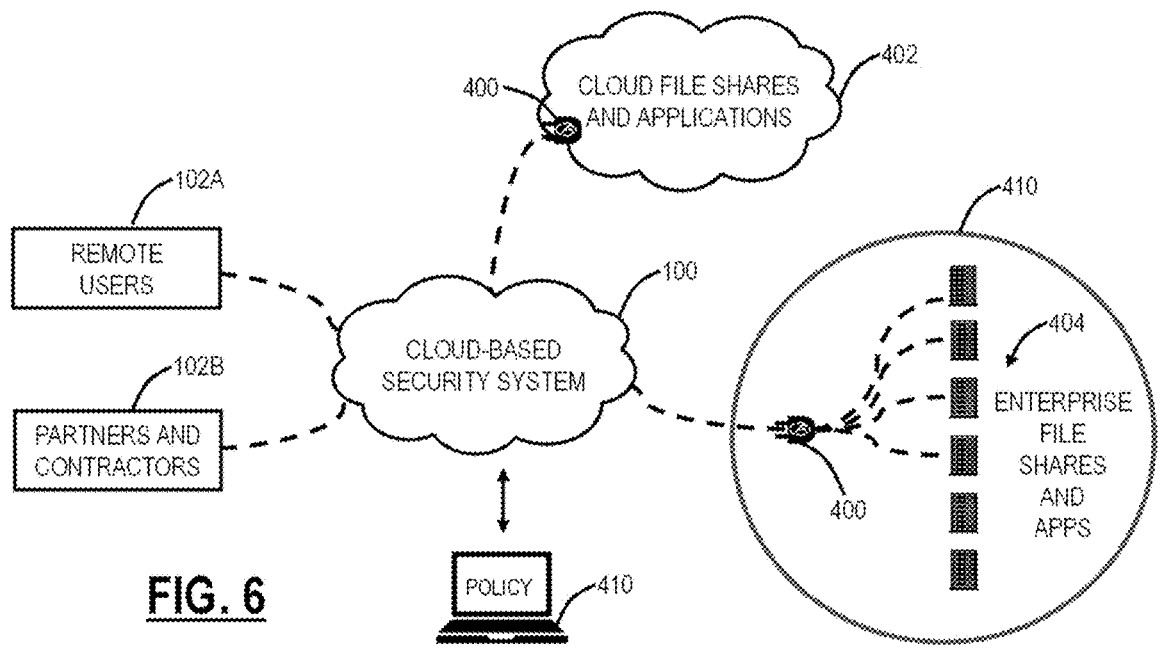
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
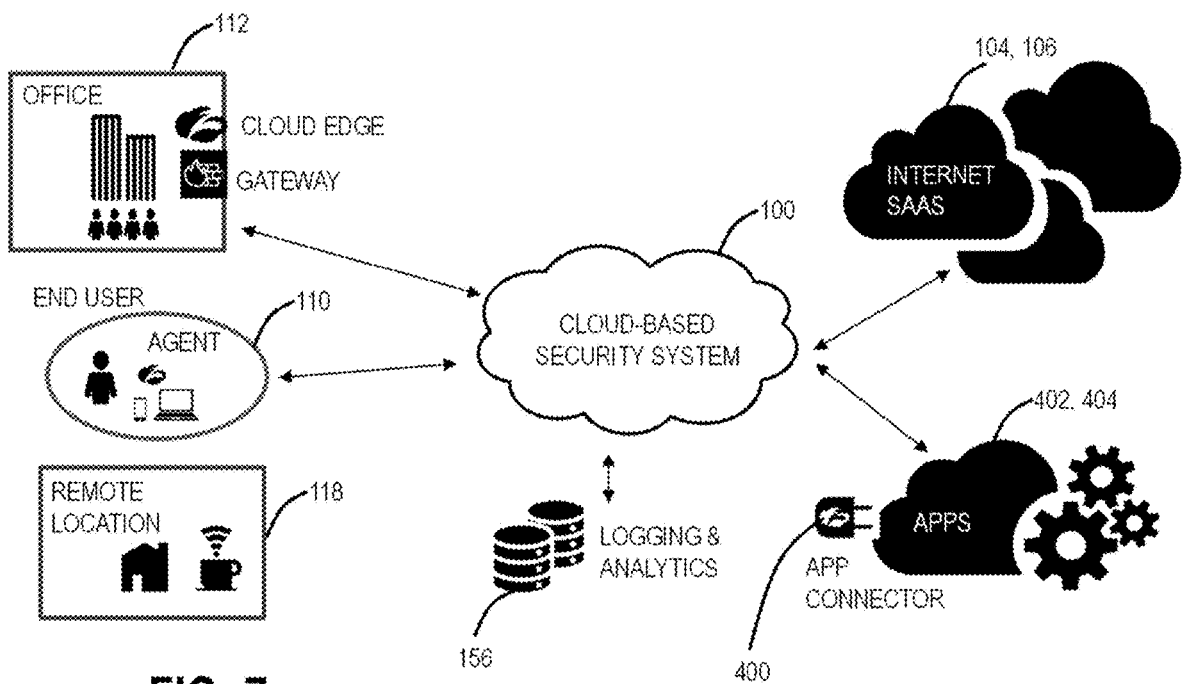
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-related data:

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-related data:

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-related data (endpoint-related data):

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
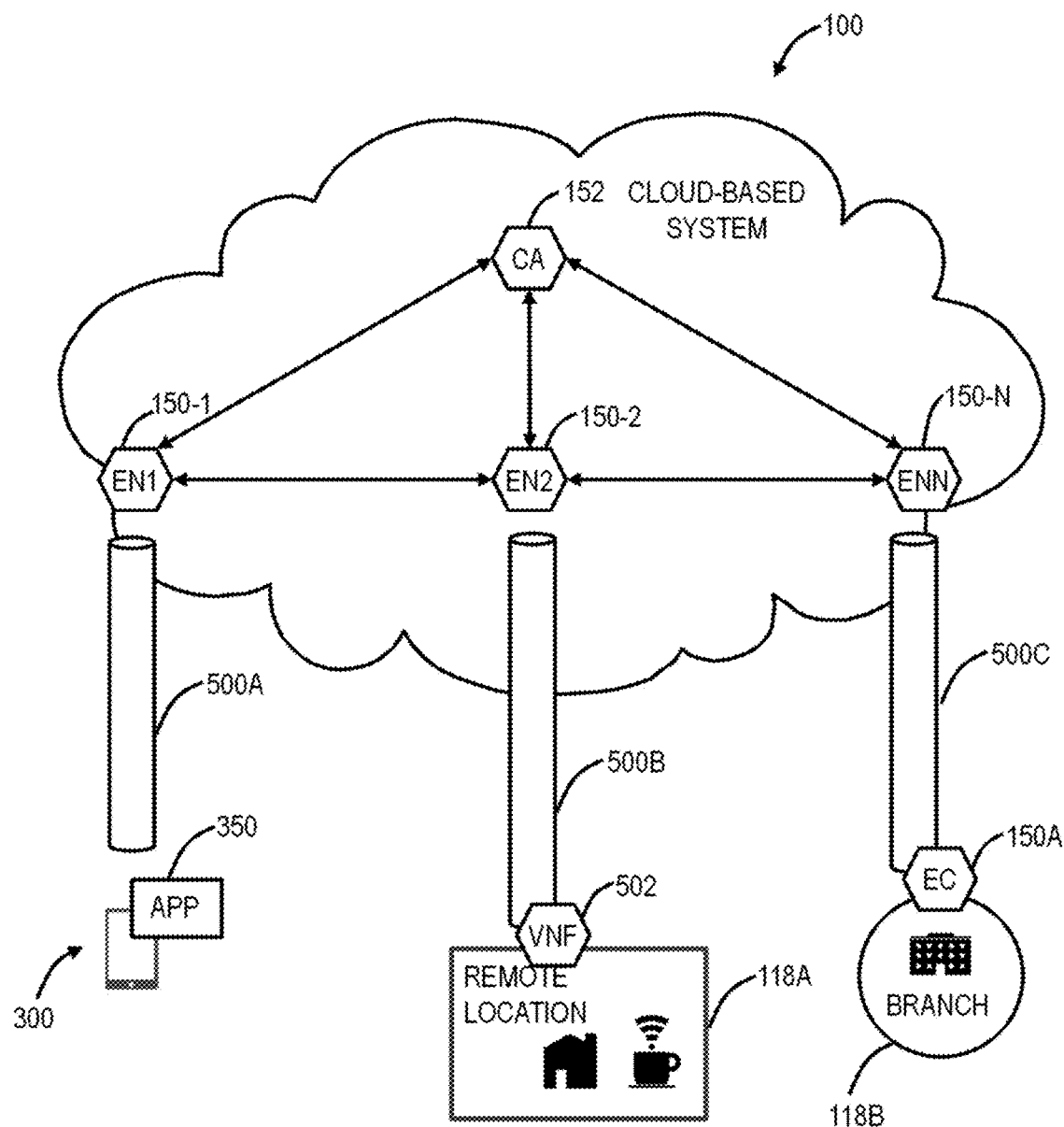
FIG. 8 is a network diagram of the cloud-based system of FIGS. 1 and 2 with various cloud tunnels, labeled as cloud tunnels, for forwarding traffic.

FIG. 8 is a network diagram of the cloud-based system 100 with various cloud tunnels 500, labeled as cloud tunnels 500A, 500B, 500C, for forwarding traffic. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

§ 8.0 Unified Identity Platform

As suggested above, there may be many types of network security and trust products that are deployed within a network or subnetwork for providing protection for users and data. Again, these products can be located in the cloud-based system 100 and/or in the cloud services 106 shown in FIGS. 1, 2, and 5-8. One function of many of these security products is related to the aspect of authenticating the identification of users and user devices.

Many trends with respect to identity-related functionalities have been witnessed. For example, the market for identity-related products has been rapidly evolving with new requirements and standards. Also, customers are demanding identity to become more central to their security policies. Existing products and platforms (e.g., various products provided by the Applicant, Zscaler, as well as other vendors) are becoming more complex, particularly as vendors expand into new technologies and add new security products. Thus, these trends may represent a need for more uniformity among different products with respect to identity-based procedures and more centralized control within this particular field of identity authentication.

Therefore, the present disclosure further describes embodiments of systems and methods for enhancing, centralizing, and simplifying identity functions with respect to multiple security and trust products. The systems described herein may be employed internally within a centralized component (e.g., server 200), such as one incorporated in the cloud-based system 100. The systems described herein may be centralized, standalone devices, systems, servers, etc., and may provide an agile identity platform that can serve any (or all) existing and future network security and trust products, such as products provided by Zscaler (e.g., ZIA, ZPA, ZDX, ZCC, ZTE, ZAB, ZApp, ZSCM, Deception, Trust, etc.) and/or other vendors.

The embodiments described below are directed to systems and methods having identity-related functionalities that can be provided, for example, by an Identity Provider (IdP). Some advantages of centralized identity-based functionality may include:
1) Simplification—such a centralized component can simplify existing platforms by abstracting identity related complexities;
2) Efficiency—such a centralized component can avoid repetition or duplication of efforts for identity-related tasks on each individual product;
3) Competitive—such a centralized component can provide greater agility and flexibility to support latest (and future) technologies in the identity domain, thus providing better overall experience than what is traditionally offered; etc.

Figure 9:
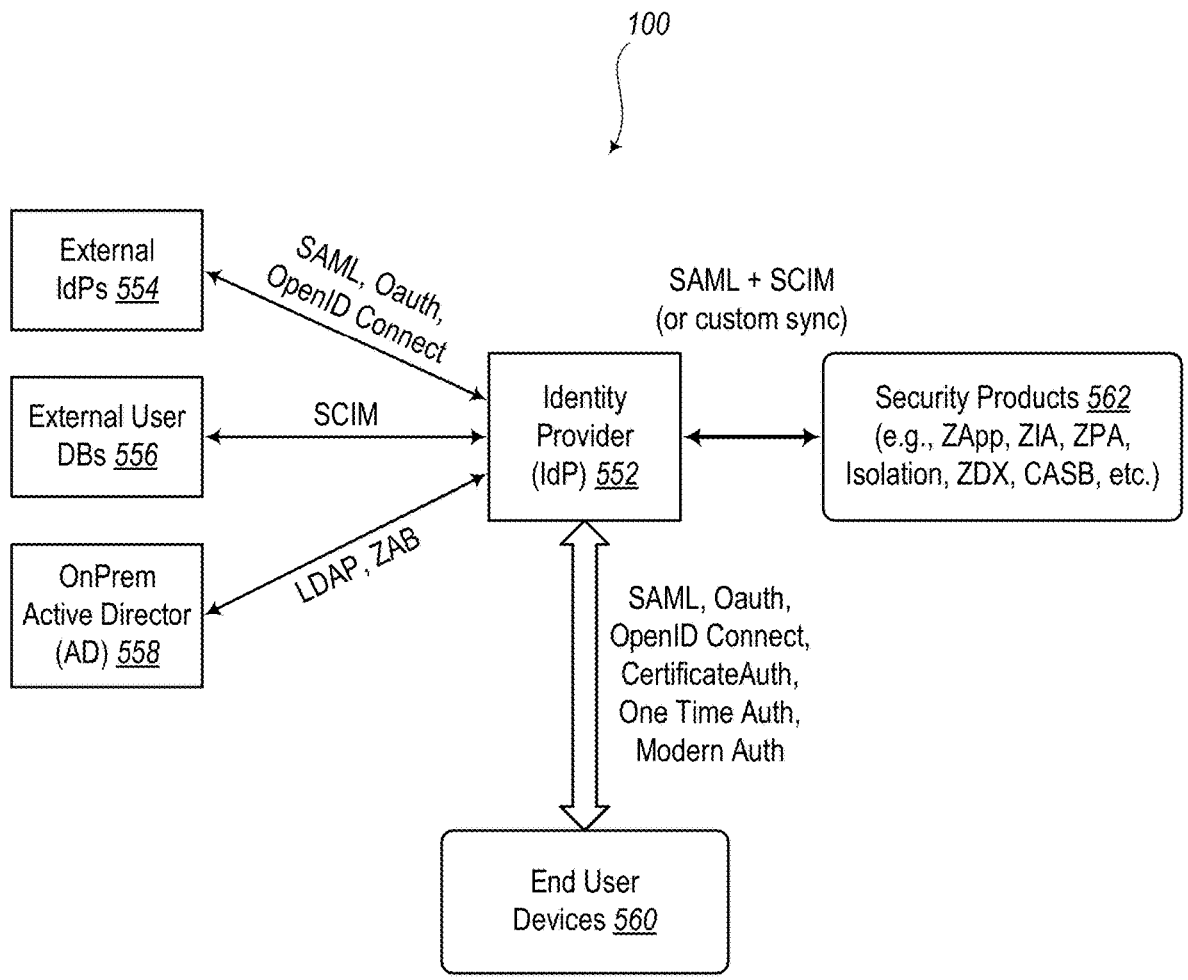
FIG. 9 is a network diagram illustrating a portion of the cloud-based system as shown in FIGS. 1, 2, and 5-8, in which an Identity Provider (IdP) is operating.

FIG. 9 is a network diagram illustrating a portion of the cloud-based system 100 in which an Identity Provider (IdP) 552 is operating. The IdP 552 may be configured as a server (e.g., the server 200 of FIG. 3) or another suitable system or platform for providing unified identity functionality. As illustrated, the IdP 552 may be configured to communicate with one or more external IdPs 554 using any suitable security, authorization, and identity protocols (e.g., Security Assertion Markup Language (SAML), OAuth 1.0, OAuth 2.0, OpenID Connect, etc.). The IdP 522 may also communicate with one or more external user databases 556, which may be associated with the System for Cross-domain Identity Management (SCIM). Also, the IdP 552 may communicate with one or more on-premises Active Directory (AD) databases 558 (e.g., Lightweight Directory Access Protocol (LDAP), Zscaler Authentication Bridge (ZAB), etc.).

In addition, the IdP 552, as shown in FIG. 9, may be configured to communicate directly with end user devices 560 using SAML, OAuth, OpenID Connect, Certificate-Auth, One Time Auth, Modern Auth, etc. The users of the end user devices 560 may wish to access the Internet or perform some type of action online. The IdP 552 may be configured as an initial gateway at this juncture to establish the identity of the users and/or end user devices 560. Then, once identity has been verified and authenticated, the end user devices 560 may be able to benefit from security products 562 (e.g., ZApp, ZIA, ZPA, Isolation, ZDX, CASB, and/or other network security or trust products). Thus, the IdP 552 is configured to perform a unified identification procedure that may be needed for each of the security products 562. In the traditional systems, it may have been necessary to establish identity before using each one of the security products 562. The embodiments described herein, however, are configured to simplify the identity-based procedures upfront and then allow the user to receive the services of any of the security products 562 as needed and to which the users are subscribed.

Thus, the IdP 552 may include any suitable systems, devices, components, etc. associated with the functionality of verifying identity. These systems of the IdP 552 may be developed as a single, unified identity platform that can serve as an internal component for any or all current and future products (e.g., Zscaler services).

It may be noted, therefore, that the systems of the IdP 552 may be configured to avoid repetition associated with logging in to multiple products or services in the field of network security. This may also simply be the development process for a service provider. That is, if a vendor were to make improvements to identity functionality on one product, the vendor would likely want to make the same improvement on the other products, which may result in the repeating of the same effort on every platform. In one example, if a SCIM function were to be added first to ZIA, then it may be beneficial to also add this to ZPA. In another example, if a multiple IdP function were to be added first on ZPA, then it may be beneficial to also add this on ZIA. With the IdP 552, as incorporated in the cloud-based system 100, it may not be necessary to perform these repetitive actions for improving each and every one of the security products 562, but instead, the IdP 552 can be improved once and each security product 562, depending on this identification functionality, can benefit from those improvements.

Also, it may be noted that this architecture allows for consistency across all the security products 562. At present, authentication configurations and behaviors may vary significantly between cloud services. For example, authentication methods supported by one security product 562 may not be available on another. Also, SCIM implementations may vary significantly on two different security products 562. A customer familiar with the configuration of one security product 562 may find that the configuration on another may be very different.

Many ease-of-configuration enhancements (e.g., XML Metadata URL) may be introduced by the systems of the IdP 552 and can be standardized across any (or all) of the security products 562. The systems of the IdP 552 can provide these benefits and may overcome the issues described above. A single authentication platform may then provide consistent identity configuration across all platforms.

With respect to a mobile portal and Zscaler Application Profiler (ZApp), a portal may be configured to sync its identity store from a Central Authority (CA) (e.g., CA 152). In some embodiments, this may preferably be done more than once every 6 hours. New registrations of ZApp users may be restricted to about 1000 users, because it may overload the SMCA. Moving this workflow to the identity platform would solve this problem (e.g., E.On, Siemens deployments). Also, since ZApp may normally perform two separate authentication requests (e.g., one for ZIA and one for ZPA), the centralized identity platform of the IdP 552 is configured to simplify this process. Furthermore, ZPA entitlement may be handled on a ZIA UI, but with the consolidated functionality, the IdP 552 can provide a unified better option. The Mobile Portal as IdP may normally only work for ZIA, but some customers may want this functionality in other security products 562 (e.g., ZPA). Each ZIA account may be tied to a specific ZPA account since there had not been a better way to handle the relationship between the two, until now. As such, with the unified identity platform, the positive qualities of each of the security products 562 can be used throughout the security platforms.

With the introduction of new products by a vendor, it may be noted that with the unified identity functionality in place, identity can play a central role in any new product that is rolled out. For example, the Applicant of the present disclosure may have already experienced this with Appsulate and ZDX. On Appsulate, the Applicant customized ZIA to support identity functions, while on ZDX, the Applicant was still leveraging ZIA for identity. When launching new products (e.g., ZDX) using an existing identity platform gives agility. For this reason, an identity database (or identity store) from one product can be reused for another. Since there was a possibility that customers could become confused by the reuse of features, the systems and methods of the present disclosure are configured to eliminate this concern. That is, the problem can be solved for each and every security product 562 (and those products developed in the future) by having a dedicated and unified identity platform.

Regarding the OneID experience, administrators (admin) may need to configure only one authentication application on Okta, Azure AD, Ping, etc. End-users may authenticate only once to access ZIA/ZPA or Admin portal. Technology partners may integrate with the IdP 552 once for receiving the benefit of all the platforms. Today, there are about ten different applications on Azure AD. Now, a single identity store may be employed for use by administrators with respect to the security products 562.

With respect to logging for identification, there is currently no option to log any identity related events on some security products 562 (e.g., ZIA, ZPA, etc.). Authentication attempts might not be logged externally. There is a need to log failed authentication attempts in order to track security events. Since SCIM transactions were not logged externally, SCIM logging can be included in the embodiments of the present disclosure.

On ZIA, it may not be easy for some customers to log authentication transactions, since SMCA does not talk to the nanolog server. On both ZIA and ZPA, the UI may not be built specifically for identity logs. There are normally two types of logging (i.e., traffic logging and audit logging). Identity logs fall in neither of those categories and could be too noisy in certain cases if they were added to those categories. Thus, the present disclosure may be configured with a separate logging category, which can be a competitive advantage since it may differentiate the IdP 552 functions from other cloud offerings and provide certain benefits as described herein.

In addition, the IdP 552 may be configured to include the ability to be compatibility with other identity partners (e.g., the one or more external IdPs 554). Each identity partner or external IdP 554 may have its own implementation of SAML and SCIM. For example, supporting federation metadata or configuration via API with partners may simplify the deployment of identity across all platforms. Thus, the present embodiments may provide high agility and customization to support all use-cases across all partners. Some products may have limitations that can slow down such customizations. The IdP 552 or other dedicated identity platform can act as a middle layer between the users and the products, abstracting the complexity from the core platform. In some embodiments, the IdP 552 may further include enhancements, such as dynamic federation metadata, partner APIs for automatic configuration of the present identity platform, etc.

According to some embodiments, a hosted database can be used for one or more of the security products 562. For example, customers may use only ZIA hosted DB for authentication and may also want a similar capability with ZPA. In this case, it may be more difficult to upsell ZPA to these customers without supporting hosted DB with ZPA. Hence, the unified identity platform of the IdP 552 is configured to take care of this problem.

With respect to Modern Authentication methods, the security products 562 may be configured to support newer authentication methods, such as OAuth 2.0 and OpenID Connect 1.0, which are new standards intended to eventually replace SAML. The security products 562 may also be configured with Device Authentication capabilities, such as a) token-based authentication for ZApp and for both ZIA and ZPA, b) certificate authentication for IoT devices, c) non-interactive authentication for servers, d) one-user—many-devices, where identity may be based on a combination of user and device, and e) edge connectors. The security products 562 may also include LDAP/AD authentication support for ZPA.

The embodiments of the present disclosure may also include other features, such as a cross-platform risk score. For example, a risk score calculated with ZIA may be shared with ZPA, and this may be published to third parties. The embodiments may include an outbound API. For example, the systems may use Microsoft Graph APIs to fetch user attributes from Azure AD (e.g., login risk). The systems and methods of the present disclosure may also include an identity proxy feature, which may be configured to protect CASB apps by acting as the SAML IdP and to authenticate individual applications behind ZPA. The Modern API Authentication may be added to the systems of the present disclosure, where a central platform is configured to ingest and authenticate all External APIs, using OAuth 2.0 authentication protocol. The embodiments may also include Identity Governance.

Embodiments of Unified Identity Platforms

Figure 10:
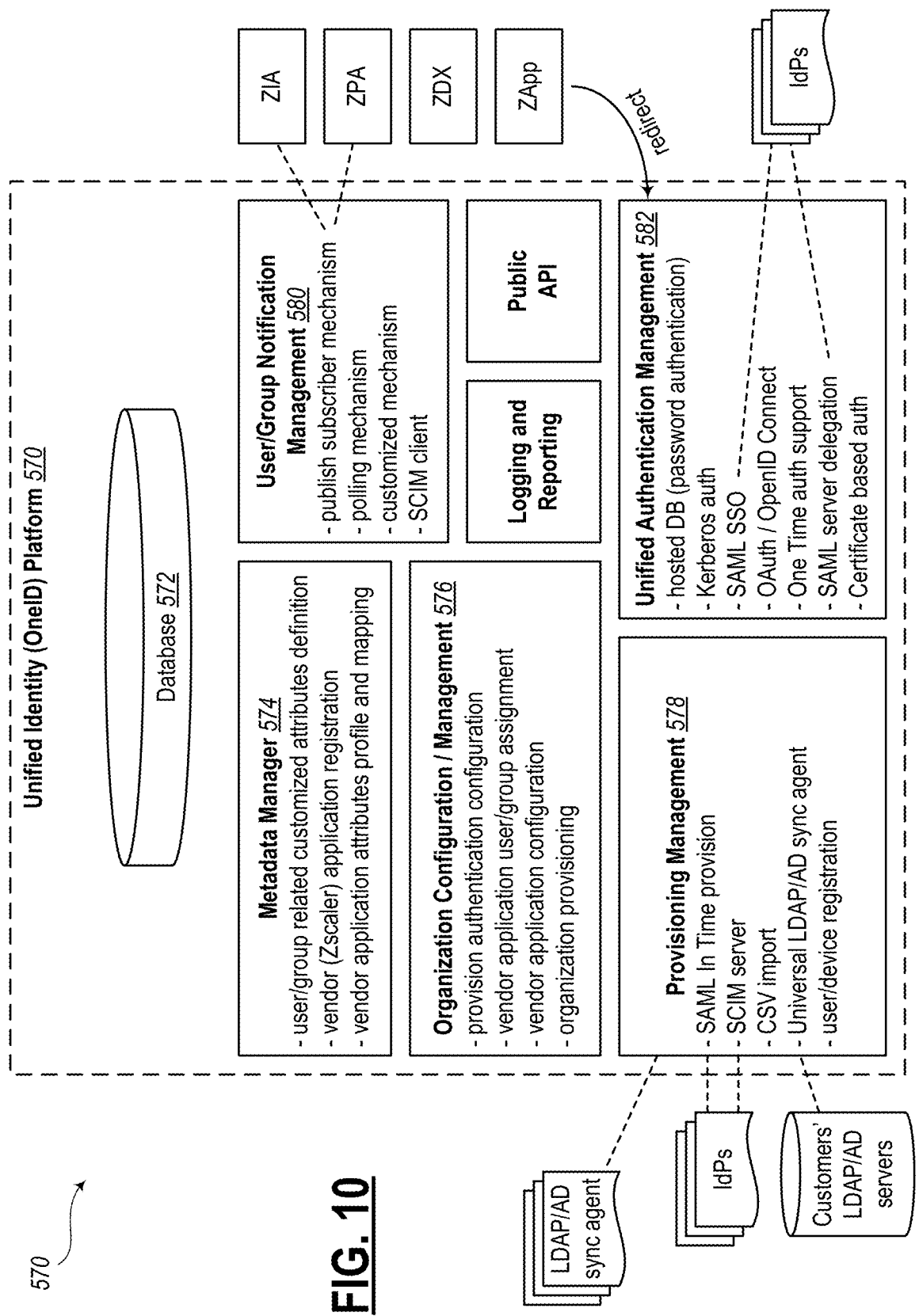
FIG. 10 is diagram illustrating a first embodiment of a unified identity platform, which may be part of the IdP shown in FIG. 9.

FIG. 10 is diagram illustrating an embodiment of a unified identity platform 570, which may be part of the IdP 552 shown in FIG. 9. The unified identity platform 570 may also be referred to as a One Identity platform, OneID platform, centralized identity platform, etc. The unified identity platform 570 may include any suitable combination of hardware and software. According to various embodiments, the unified identity platform 570, as illustrated, may include a database 572, a metadata management module 574, an organization configuration module 576, a provision management module 578, a notification module 580, and a unified authentication control module 582. In some embodiments, the unified identity platform 570 may also include logging and reporting modules, public API support, and other components.

The database 572 may include one or more of a) Horizontal Scale, b) High write throughput, c) Redundancy, and d) Geographical support. The metadata management module 574 may include one or more of a) User/Group/Device customized attributes definition, b) Zscaler application registration support, c) Zscaler application profile and attributes mapping, which may include 1) User/group/device mapping between One Identity Platform and each application and 2) may define notification mechanism to user/group/device change. The organization configuration module 576, for providing configurations and/or management of organizations or companies, may include one or more of a) Organization provisioning, b) Zscaler Application enablement for an organization, which may include 1) Trigger organization information to be pushed to related Zscaler application, and 2) may associate OrgID between one identity platform and related Zscaler applications, c) Organization specific provision/authentication management, and d) User/Group assignment for related Zscaler application.

The provision management module 578 may include one or more of a) SAML In Time provisioning, which may be configured to consider how to publish data to a related Zscaler application (or other product) in real time, b) SCIM provisioning, c) CSV import for hosted DB, d) Universal LDAP/AD Sync Agent, e) LDAP/AD agent in customer datacenter, and f) API endpoint for device provisioning/deprovisioning. The notification module 580 may be configured for notifying users or groups of users, based on how a system is configured, and may include one or more of a) a Publish/Subscribe mechanism, b) a Polling mechanism, c) a SCIM client, and d) a Customized notification mechanism. Also, the unified authentication control module 582 may include one or more of a) Hosted DB based authentication, b) One time password reset/authentication support, c) Kerberos Authentication, d) SAML Single Sign-On (SSO), e) OAuth2/OpenID Connect, f) Delegated Authentication, and g) Certificate-based Authentication.

Figure 11:
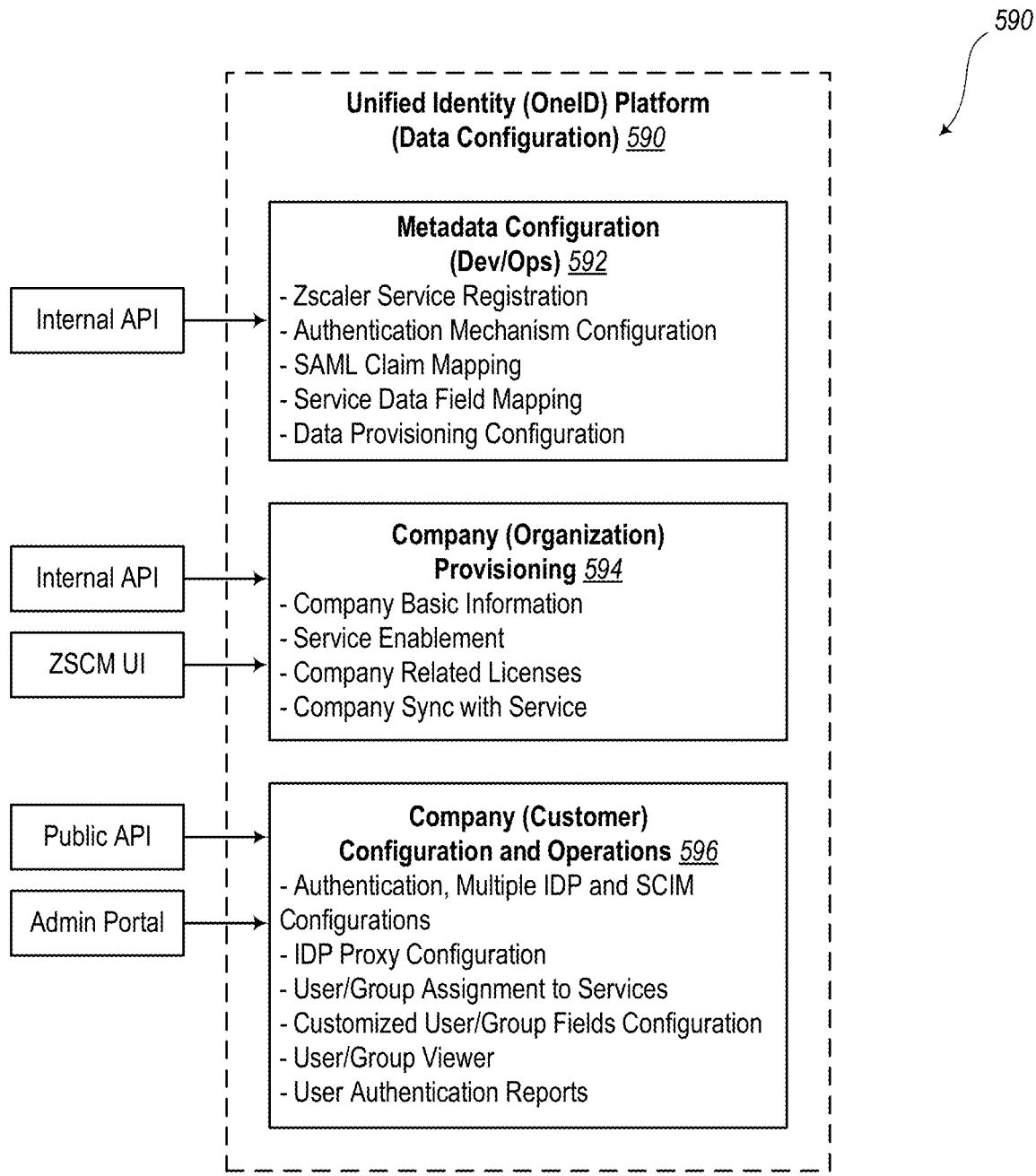
FIG. 11 is a diagram illustrating another embodiment of a unified identity platform or data configuration component, which may consolidate identity functions into one centralized unit.

FIG. 11 is a diagram illustrating another embodiment of a unified identity platform 590 (or data configuration component), which may be considered to be an implementation of the OneID platform for consolidating identity functions into one centralized unit. In some respects, the unified identity platform 590 may include some or all of the functionality of the unified identity platform 570 of FIG. 10. According to various embodiments, the unified identity platform 590 may have similarities to the metadata management module 574, the organization configuration module 576, and the provision management module 578.

In particular, the unified identity platform 590, as shown, includes a metadata configured unit 592, a company provisioning unit 594, and a company configuration and operation unit 596. The metadata configured unit 592 may be configured for Service Registration & Metadata configuration (Dev) functionality. The purpose of this component may be to allow easy extension to support more security services moving forward. The metadata configured unit 592 may include one or more of a) having support for only ZIA/ZPA in phase 1, b) using several parts of metadata configuration, such as 1) an authentication mechanism (e.g., SAML for ZIA/ZPA in phase 1), 2) SAML claim mapping, 3) data fields mapping (e.g., how to map data fields of user/group to fields in each service), 4) Syncing/provisioning mechanism (e.g., message queue may be the only choice for phase 1), and c) incorporate the metadata configuration functionality through internal API and save in data storage.

The company provisioning unit 594 (or OPS) is configured to allow OPS to provision companies in OneID platform and then sync to different services. The company provisioning unit 594 may include one or more of a) basic company information (e.g., associated with company accounting), b) service enablement, c) licenses, and d) syncing function for the company to each enabled service.

The company configuration and operation unit 596 (or customer) may be configured to list the data configurations by customer that may need to be done on this platform. The company configuration and operation unit 596 may include one or more of a) authentication setting, b) multiple IDP configurations and SCIM configuration, c) IDP Proxy configuration, d) User/Group scope to Zscaler Service configuration, e) Customized user/group attributes definition, f) User/Group viewer, and g) user authentication reports. It may be noted that the IDP configuration information may need to be synced back to each service as the service may also need related information (e.g., location to IDP configuration).

Figure 12:
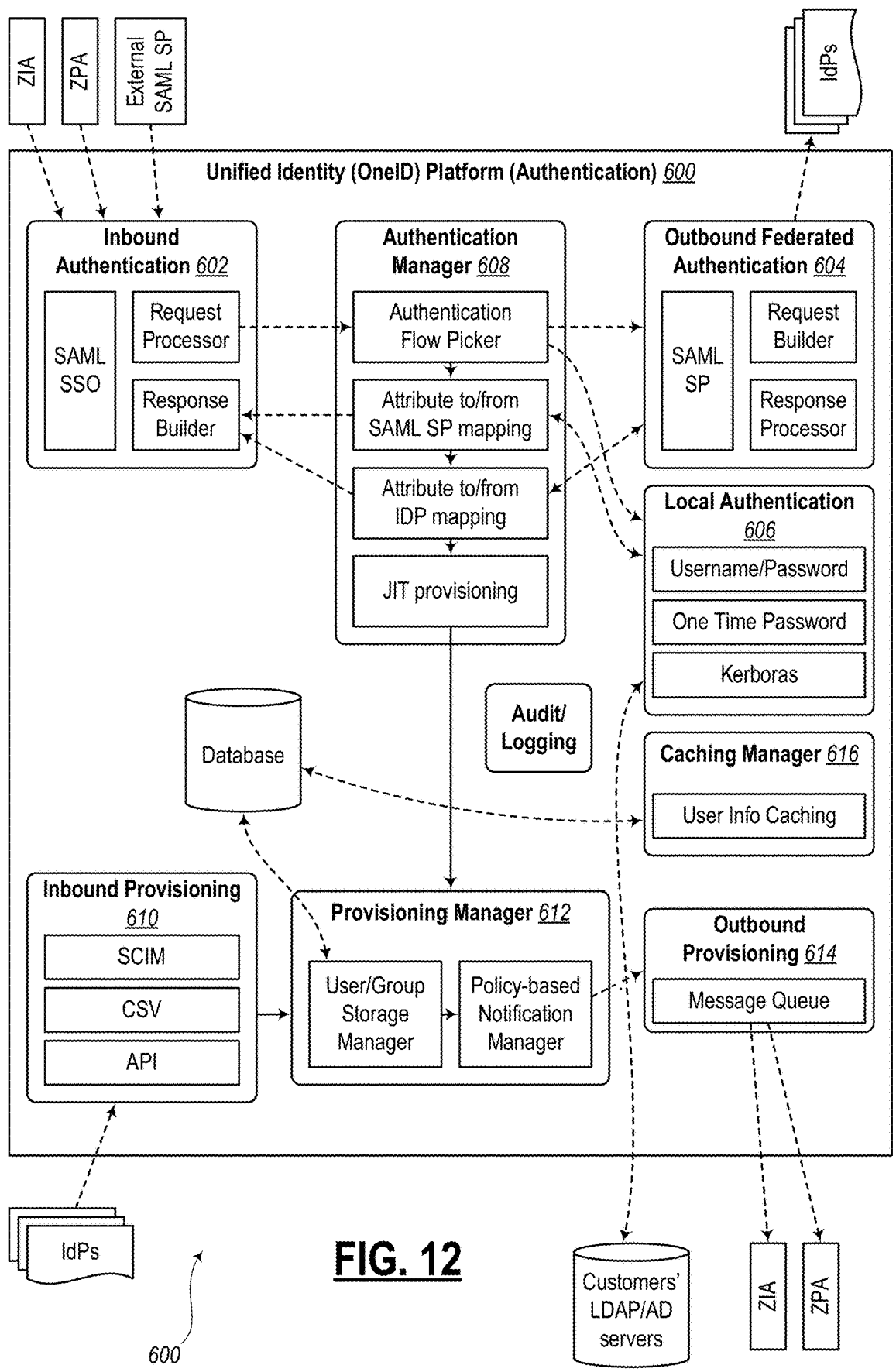
FIG. 12 is a diagram illustrating an embodiment of yet another unified identity platform, which may be related to an authentication flow.

FIG. 12 is a diagram illustrating an embodiment of another unified identity platform 600, which may be related to an authentication flow. The unified identity platform 600 may be considered to be an implementation of the OneID platform for consolidating identity functions into one centralized unit. In some respects, the unified identity platform 600 may include some or all of the functionality of the unified identity platform 570 of FIG. 10 and/or the unified identity platform 590 of FIG. 11. According to various embodiments, the unified identity platform 600 may have similarities to the unified authentication control module 582, the provision management module 578, the database 572, and the logging and reporting features.

In particular, the unified identity platform 600, as shown, includes an inbound authentication unit 602, an outbound federated authentication unit 604, a local authentication unit 606, an authentication manager 608, an inbound provisioning unit 610, a provisioning manager 612, an outbound provisioning unit 614, a data caching manager 616, etc. The inbound authentication unit 602 (InAuth) may be responsible for identifying and parsing incoming authentication requests and later building the corresponding response. On phase 1, for example, only SAML 2.0 protocol may be supported, and the inbound authentication unit 602 may be served as SAML IDP from SAML protocol point of view. Also, the inbound authentication unit 602 may include DOS prevention. For all the security and trust products, the OneID platform may be part of the IdP and can support SAML as the protocol between OneID and one or more products (e.g., ZIA, ZPA, etc.). There may be a metadata exchange flow being set or an operator (admin) can set the config manually. If manual, then the methods of the present disclosure may include a flow for the Signing Certificate update (when nearing expiry) at the product end. It may be noted that this can be done manually as ZIA does not currently support MetaData URL for SAML, but may use certificate upload instead. If later versions of ZIA support the metadata URL, then the methods may include considering the certificate expiration (as OneID platform may be configured to publish both certificates in its metadata. Some products (e.g., ZIA, ZPA, etc.) may support multiple IdPs configured at their end. If supported, then the OneID system may be seamlessly introduced such that both a current and new way of authentication may overlap for a brief period up to a point, and then the new OneID system can take over.

Furthermore, there may be two parts of IdP configurations on the products (e.g., ZIA, ZPA), where one may be for an admin level and the other may be for a normal user level. For the admin level, only one IdP may be supported for normal user level. This may support multiple IdPs. The deployment may include switching to the OneID once it is enabled on the product (e.g., ZIA). However, OneID may include identity related certificates and information, which can be saved in different places on the products (e.g., ZIA, ZPA, etc.), which may be an improvement over the IdP configured per organization. As for the certificate, if self-signed certificates are used, an automatic 10-years expiration date may be set.

Referring again to the inbound authentication unit 602, it may be understood that, in a later phase, OAuth 2.0 and OpenID Connect 1.0 may be added into this component. The functionality for the inbound authentication unit 602 may include a) accepting SAML requests from SAML SP, b) passing and validating SAML requests, c) generating Zscaler object models, and d) communicating with the authentication manager 608.

The outbound federated authentication unit 604 (FedAuth) may be responsible for authenticating the user with the external system. In some embodiments, the outbound federated authentication unit 604 may be configured to handle Single Log-Out (SLO) from customer IdP and propagate all the way down to the products (e.g., ZIA, ZPA, etc.). In some embodiments, this may be related to a "single logout" process between OneID and other services. Depending on this, the outbound federated authentication unit 604 may further be configured to maintain information about a currently signed-in session.

According to some embodiments, only the SAML 2.0 Service Provider (SP) is supported, for instance. Then, for later phases, the unified identity platform 600 could support OAuth 2.0 or OpenID Connect 1.0 Relying Party (RP) and support social login apps (e.g., Google, Facebook, etc.). The functionality for the outbound federated authentication unit 604 may include one or more of a) receiving a Zscaler object model from AuthCtl, b) building a SAML request and send it to an external SAML Identity Provider, c) receiving SAML response and producing the Zscaler object model, and d) notifying the authentication manager 608. Also, potential considerations for Libraries may include the Spring Security Framework.

The local authentication unit 606 (LocAuth) may be responsible for authenticating the user with internal available credentials. For phase 1, only the username and password may be supported. For later phases, LDAP, AD, Kerberos, IWA, and/or OTP authentication can be supported. The functionality for the local authentication unit 606 may include one or more of a) receiving Zscaler object model from authentication control component, b) building web form and for username/password input, and d) notifying the authentication manager 608.

The authentication manager 608 (AuthMgr) may be a key part of the authentication process. It may include one or more of the following features. Based on the Zscaler object model from Inbound authentication, the authentication manager 608 may determine the authentication flow that will be invoked. Data field mapping and conversion may be based on the configuration. The authentication manager 608 may invoke one or more related authentication components (e.g., LocAuth, FedAuth, etc. or various combinations thereof). It can also determine whether to support Just In Time (JIT) provisioning when authentication is finished and may invoke provision management components. Also, it can return the result to InAuth to generate a response.

The inbound provisioning unit 610 (InProv) may be configured to focus on how to provision user/group information into Zscaler data storage. SCIM, CSV, and/or API import may be supported for phase 1. AD and/or LDAP sync may be supported for future phases. The inbound provisioning unit 610 may be responsible for converting to the Zscaler object model with mapping defined for SCIM.

The provisioning manager 612 (ProvMgr) may be configured to focus on provisioning user and/or group information into the Zscaler data storage. It may receive data from JIT provisioning and InProv and save to Data storage. Based on user/group assignment policy for each Zscaler service, it may also notify the data change to the outbound provisioning unit 614.

The outbound provisioning unit 614 (OutProv) may be responsible for notifying different services about the user/group data change and other configuration changes needed to be synced between the OneID platform and each service. A message queue may be used to sync data within Zscaler services. In later phases, SCIM can be used to sync data to external services.

The data caching manager 616 (CacheMgr) may be responsible for caching user/group/session data in memory to speed up the authentication processing and various operations needed within OneID platform. In addition, the unified identity platform 600 may include other components as needed for performing the identity-related or authenticated-related functionality. Some of these other components may be added in the present implementation or in future versions. Also, a component for handling device information may be part of the authentication process. As such, the "device registration" logic could be to this platform.

Identity Authentication Procedures

Figure 13:
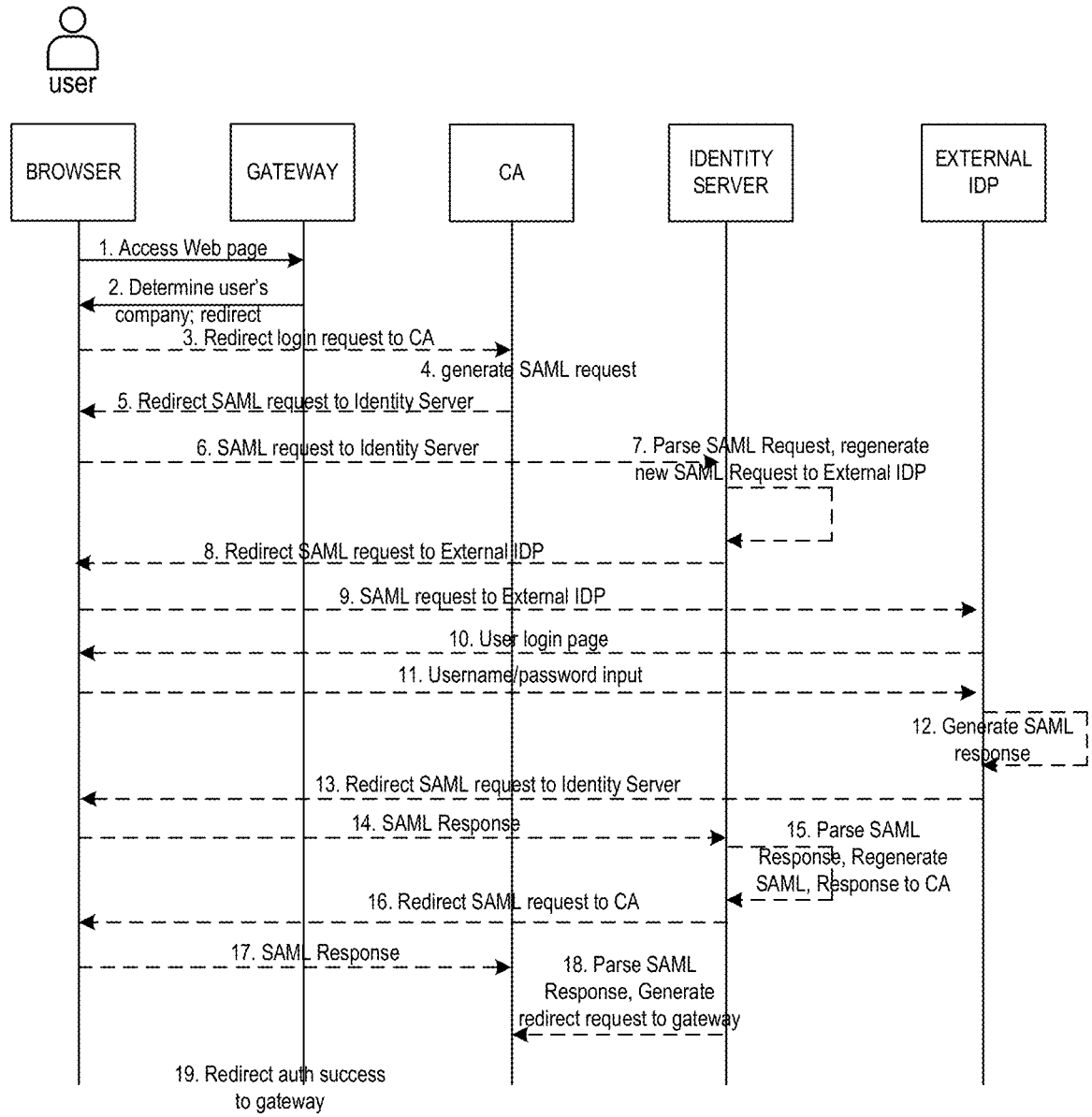
FIG. 13 shows a sequence diagram for authenticating identity in the Zscaler Internet Access (ZIA) product.
Figure 14:
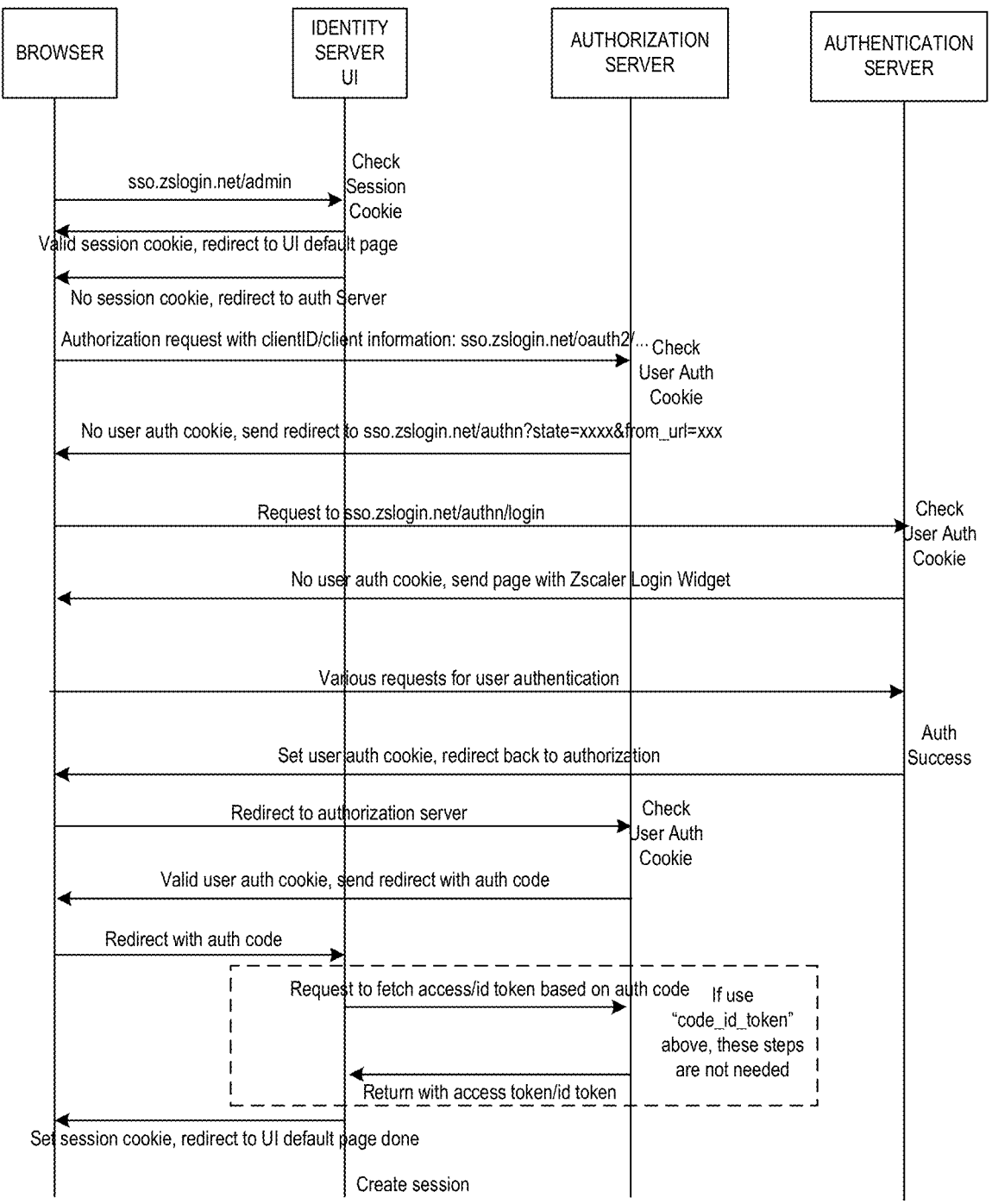
FIG. 14 shows a sequence diagram for authenticating identity in the OpenID Connect product.

FIGS. 13 and 14 are sequence diagrams for showing identity authentication procedures for different products. For example, FIG. 13 shows a sequence diagram 620 for authenticating identity in the Zscaler Internet Access (ZIA) product and FIG. 14 shows a sequence diagram 625 for authenticating identity in the OpenID Connect product.

The following are open source platforms that may be used for authenticating identity. SAML SP & IDP Libraries may include:

| No | Name | License | Functions | Comments |
|----|------|---------|-----------|----------|
| 1 | OneLogin SAML Toolkit | Apache 2.0 License | SAML 2.0 SP | |
| 2 | Spring Security | Apache 2.0 License | SAML 2.0 SP | Spring security includes many security related features, and up to date security patches, so would be a good candidate if we build our service based on the Spring framework. |
| 3 | Shibboleth | Apache 2.0 License | SAML 1.1 IDP SAML 2.0 SP(C code) & IDP(Java) | Note: SAML IDP 2.4.5 is a single package, but not maintained anymore. Newer version (e.g., 3.0, 4.0) is based on the Spring web flow framework and would be hard to use as a standalone package. |
| 4 | OpenAM | Apache 2.0 License | SAML 2.0 SP & IDP | |
| 5 | ZXID | | | ZXID is implemented in C but supports (via SWIG) Perl, PHP, and Java Implements SAML V2.0 SP (98% done) |
| 6 | Keycloak | Apache 2.0 license | SAML 2.0 SP & IDP | part of the bigger project, however the support for SAML IDP can be extracted and used as a module (may require some other Keycloak module dependency). |

OAuth2.0 and OpenID Connect (RP and OP) Libraries may include:

| No | Name | Version | | | |
|----|------|---------|---|---|---|
| 1 | Spring Security | Apache 2.0 License | OpenID Connect 1.0 RP | Spring security includes many security related features, and up to date security patches, so would be a good candidate if we build our service based on the Spring framework. |
| 2 | Nimbus OAuth 2.0 SDK with OpenID Connect extensions | Apache 2.0 license. | OAuth2/OpenID connect RP & OP | Open source is active maintained https://connect2id.com/products/nimbus-oauth-openid-connect-sdk |
| 3 | Mitreid | Apache 2.0 License | OAuth2/OpenID Connect OP | Not much activity recently https://github.com/mitreid-connect/OpenID-Connect-Java-Spring-Server |
| 4 | Light OAuth2 | Apache 2.0 License | OAuth2/OpenID Connect OP | Based on its own Light4j framework. Will need whole set of light4j support. https://github.com/networknt/light-oauth2 |

| No | Name | Version | | |
|---|---|---|---|---|
| 5 | Pac4j | Apache 2.0 License | OAuth2/OpenID Connect OP | mainly used for Client support for different framework https://www.pac4j.org |
| 6 | KeyCloak | Apache 2.0 License | OAuth2/OpenID Connect RP & OP | Good candidate for OP support (if we choose SAML IDP package from Keycloak) |

Candidate Libraries for Consideration may include:

| No | Name | Version | | |
|---|---|---|---|---|
| 1 | Spring Security | Apache 2.0 License | OpenID Connect 1.0 RP, SAML SP | Spring security includes many security related features, and up to date security patches, so would be a good candidate if we build our service based on the Spring framework. |
| 2 | Nimbus OAuth 2.0 SDK with OpenID Connect extensions | Apache 2.0 license. | OAuth2/OpenID connect RP & OP | Open source is active maintained https://connect2id.com/products/nimbus-oauth-openid-connect-sdk |
| 3 | Keycloak | Apache 2.0 License | OAuth2/OpenID Connect OP, SAML IDP | |
| 4 | Shibboleth | Apache 2.0 License | SAML 1.1 IDP SAML 2.0 SP(C code) & IDP(Java) | Note: SAML IDP 2.4.5 is a single package, but not maintained anymore. Newer version (e.g., 3.0, 4.0) is based on the Spring web flow framework and would be hard to use as a standalone package. |

Figure 15:
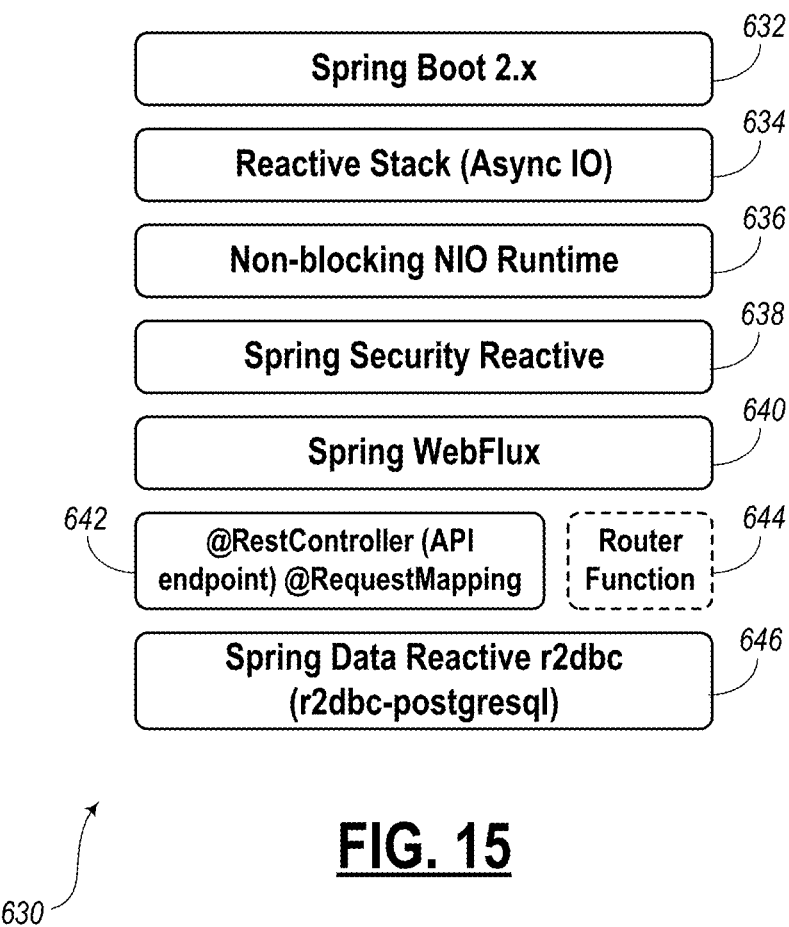
FIG. 15 is a diagram illustrating an embodiment of a schema for an API interface and database.

FIG. 15 is a diagram illustrating an embodiment of a schema 630 for an API interface and database. The schema 630 may be part of a Restful API Web Technology Stack. The schema 630 may support a non-blocking web stack to handle concurrency with a small number of threads and scale with fewer hardware resources. Also, the schema 630 may support non-blocking database connectivity (e.g., reactive relational database connectivity (r2dbc), etc.). Furthermore, the schema 630 may include web security control, easy to implement Restful API (e.g., through annotation), and/or easy to support API documentation.

Figure 16:
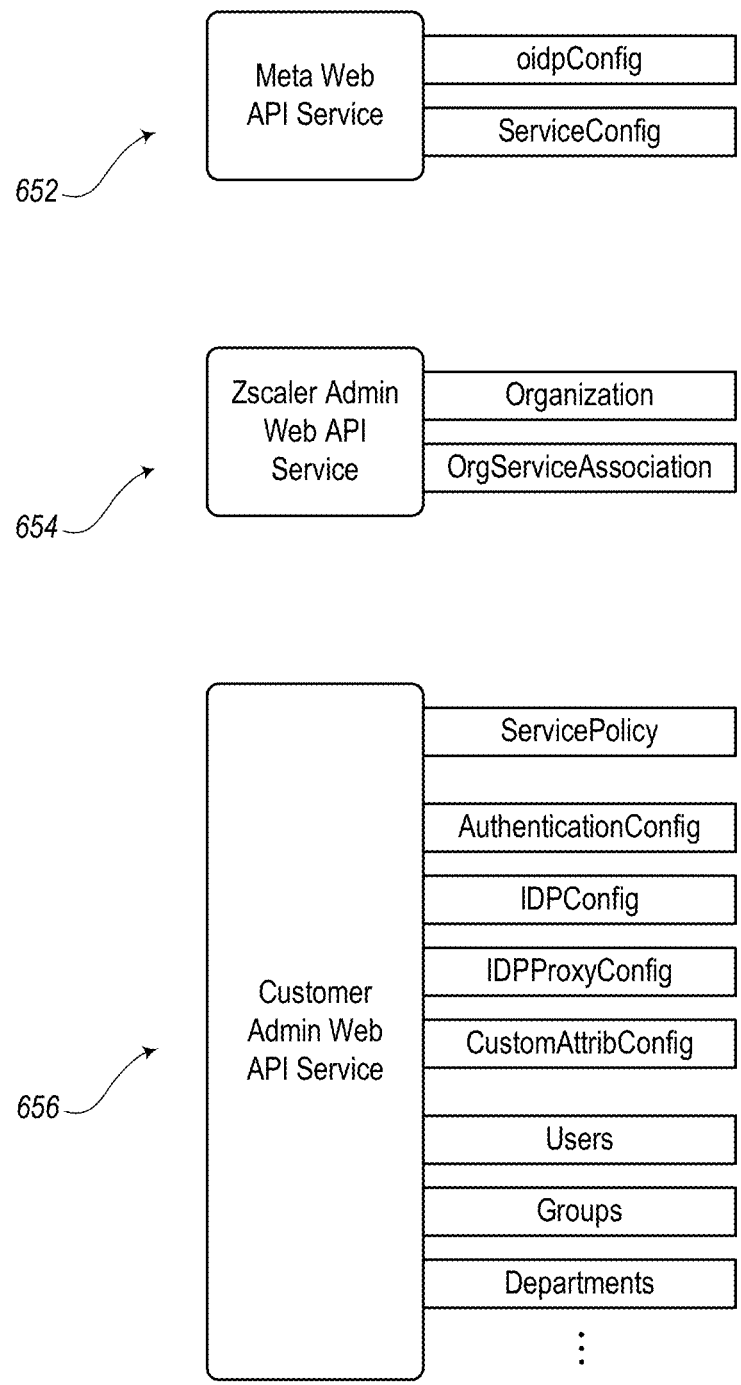
FIG. 16 is a diagram illustrating embodiments of Restful API Service Modules.

FIG. 16 is a diagram illustrating embodiments of Restful API Service Modules 652, 654, 656. As one example, Meta Web API Service may include/meta/OidpConfig, as follows:

| Field | Type | Not Null | Default Value | Comment |
|---|---|---|---|---|
| oidp_id | int4 | y | | |
| name | text | y | | |
| config_data | json | y | | Json format metadata |

The service config may include:

| Field | Type | Not Null | Default Value | Comment |
|---|---|---|---|---|
| service_id | int4 | y | | |
| name | text | y | | |
| type | int4 | | | 1. Internal 2. external |
| cloud_id | int4 | y | | |
| status | int4 | y | | |
| client_protocol | int4 | y | | 0x1: SAML 0x2: OpenID ... |
| sync_mechanism | int4 | | 0 | |
| config_data | json | y | | Json format metadata | service attribute mapping:

| Field | Type | Not Null | Default Value | Comment |
|---|---|---|---|---|
| service_id | int4 | y | | |
| mapping_info | json | y | | |

Organization Provisioning Method

Figure 17:
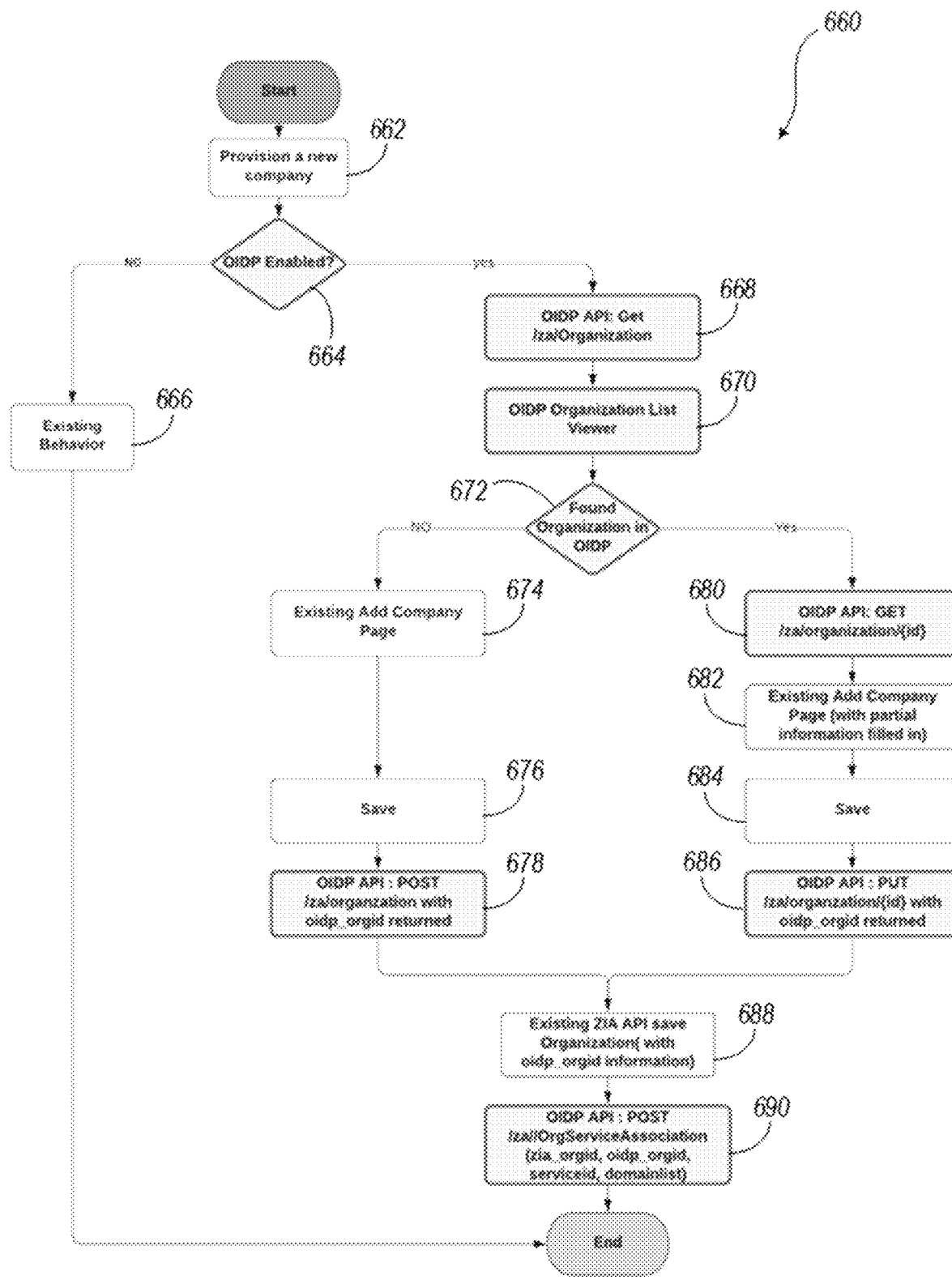
FIG. 17 is a flow diagram illustrating an embodiment of a method of an Admin Web API Service (e.g., ZIA).

FIG. 17 is a flow diagram illustrating an embodiment of a method 660 of an Admin Web API Service (e.g., ZIA). Although ZIA is used as an example in this embodiment, it should be noted that other products may be configured to incorporate the method 660 of FIG. 17. In some respects, the method 660 may be referred to as ZIA Organization Provisioning with OpenID Protocol (OIDP) Flow.

The method 660 may include provisioning a new company (block 662) and determining if OIDP is enabled (block 664). If not enabled, the method 660 continues with existing behavior (block 666) and then ends. If enabled, the method 660 includes allowing the OIDP API to get the "organization" (block 668) and opening an OIDP organization list viewer (block 670).

Next, the method 660 includes determining if the organization can be found in the list (block 672). If not, the method 660 is configured to go to an existing add company page (block 674), save (block 676), allow the OIDP API to post the "organization" with identity of the organization returned (block 678), and then proceed to block 688.

However, if an organization is found, the method 660 is configured to allow the OIDP API to get the ID of the organization (block 680). The method 660 then includes existing add company page (with partial information filled in) (block 682), saving (block 684), allowing the OIDP API to put the organization ID with oidp_orgID returned (block 686), and then proceeding to block 688.

In block 688, the method 660 includes existing ZIA API save organization (with oidp_orgID information). Then, the method 660 includes allowing the OIDP API to post Org-ServiceAssociation (zia_orgID, oidp_orgID, serviced, domainlist) (block 690). After this, the method 660 ends.

Authentication Framework

The embodiments of the present disclosure may also include an Authentication Web Technology Stack. The Authentication framework may be based on the Spring framework (e.g., utilizing Spring security code, as needed). This framework may include the following features.

The framework may include comprehensive and extensible support for both Authentication and Authorization. Also, it may be a de facto standard for securing Spring-based applications. It may also support authentication and include a) username and password (e.g., password encoder), b) LDAP, c) OAuth 2.0 OpenID Authentication, d) SAML 2.0 SP, and/or e) X.509 Authentication.

It also may be easy to extend the framework to support additional authentication and authorization features. It may have protection against attacks, like session fixation, clickjacking, cross site request forgery, etc. Also, its security update may be fast and up to date. It can also be combined with Webflux to support reactive programming to achieve better performance.

Figure 18:
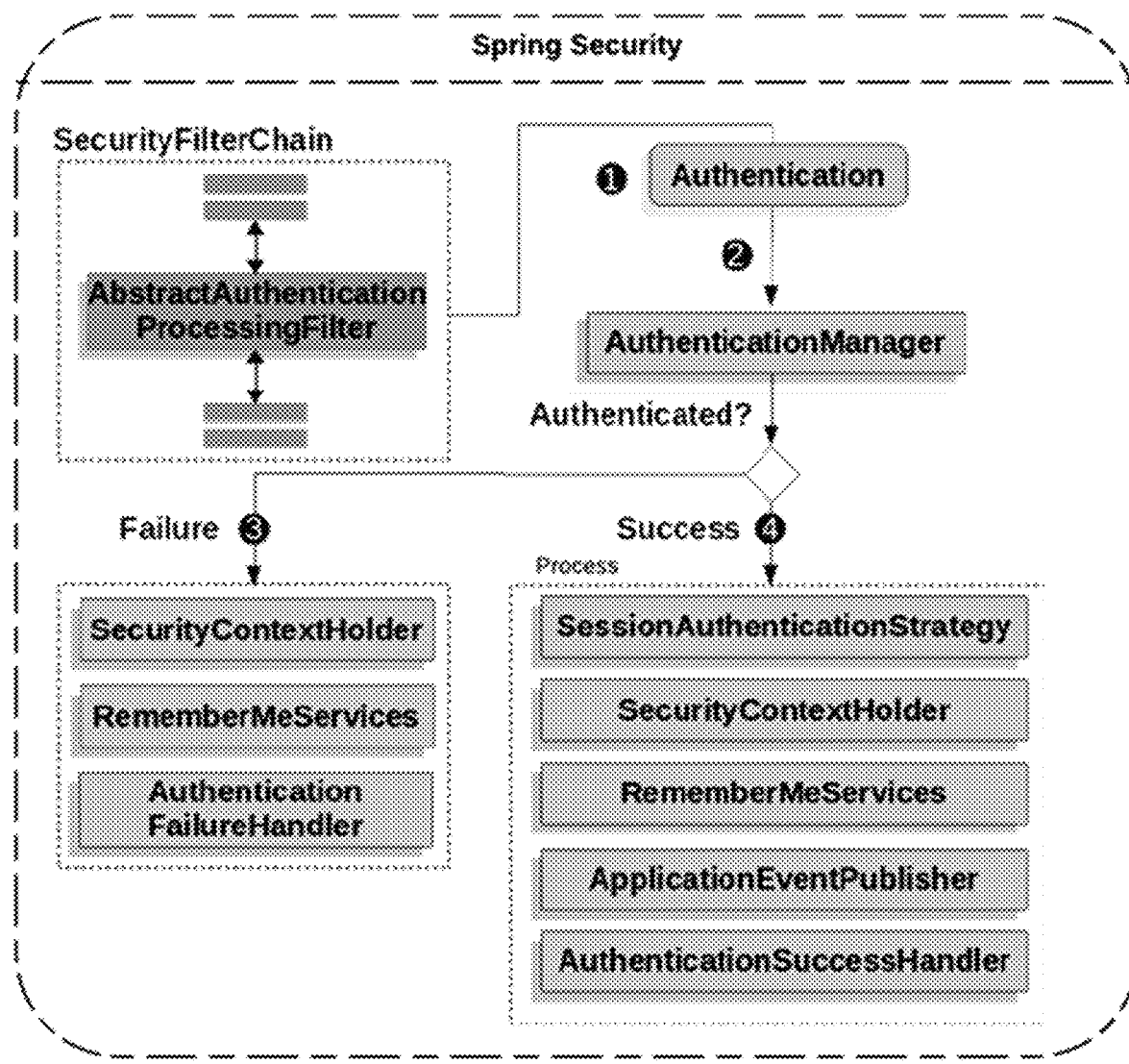
FIG. 18 is a diagram illustrating an embodiment of an authentication framework.

FIG. 18 is a diagram illustrating an embodiment of an authentication framework 700. The authentication framework 700 may include at least parts of the schema 630 for the API interface and database as shown in FIG. 15. As illustrated, the authentication framework 700 may include a Security/Filter chain, authentication, and then failure and success branches based on the results of the authentication process. The authentication framework 700 may include an Authentication Flow Diagram, Authentication Manager, Security Filter support, Authentication Provider, Web Entry-Point, and/or other components. Library usage may include SAML 2.0 support and OpenSAML 3.4.5.

Figure 19:
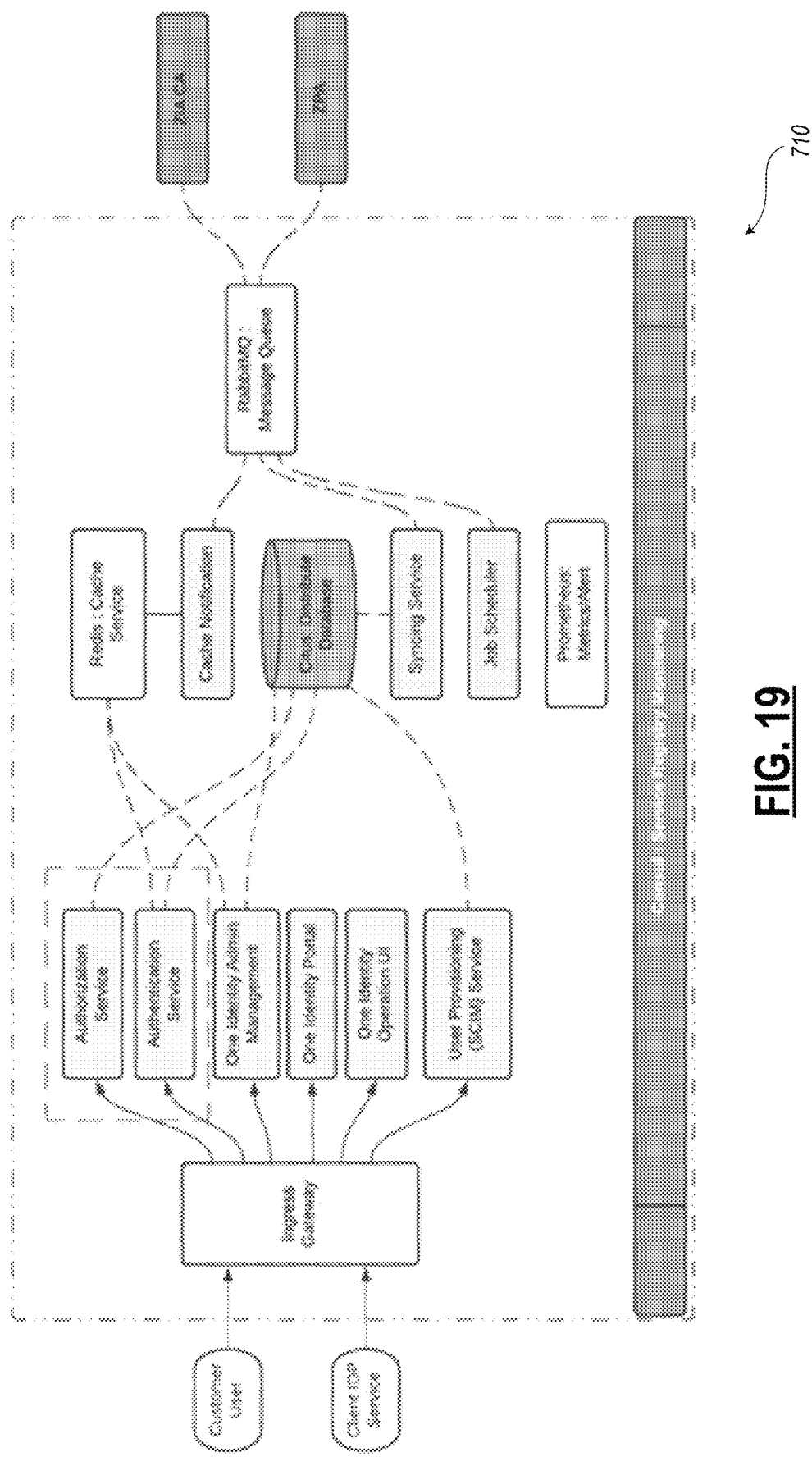
FIG. 19 is a diagram illustrating an embodiment of a service registry monitoring system.

FIG. 19 is a diagram illustrating an embodiment of a service registry monitoring system 710. The OneID Configuration API Service can serve as a OneID management portal. The service registry monitoring system 710 may include Authentication Service, Authorization Service, Reverse Proxy (Load Balancing), User Provisioning Service (SCIM), Caching service (e.g., used internally for sharing authentication and caching data for better performance), Syncing Service (e.g., used to sync data between one identity service and other services), Message Queue Service (e.g., used by syncing service for data exchange between one identity service and other services), DNS service (e.g., used to publish DNS information for SCIM/authentication/API), Service Registry & Monitoring Service (e.g., distributed service management and health monitoring), and/or other features.

Figure 20:
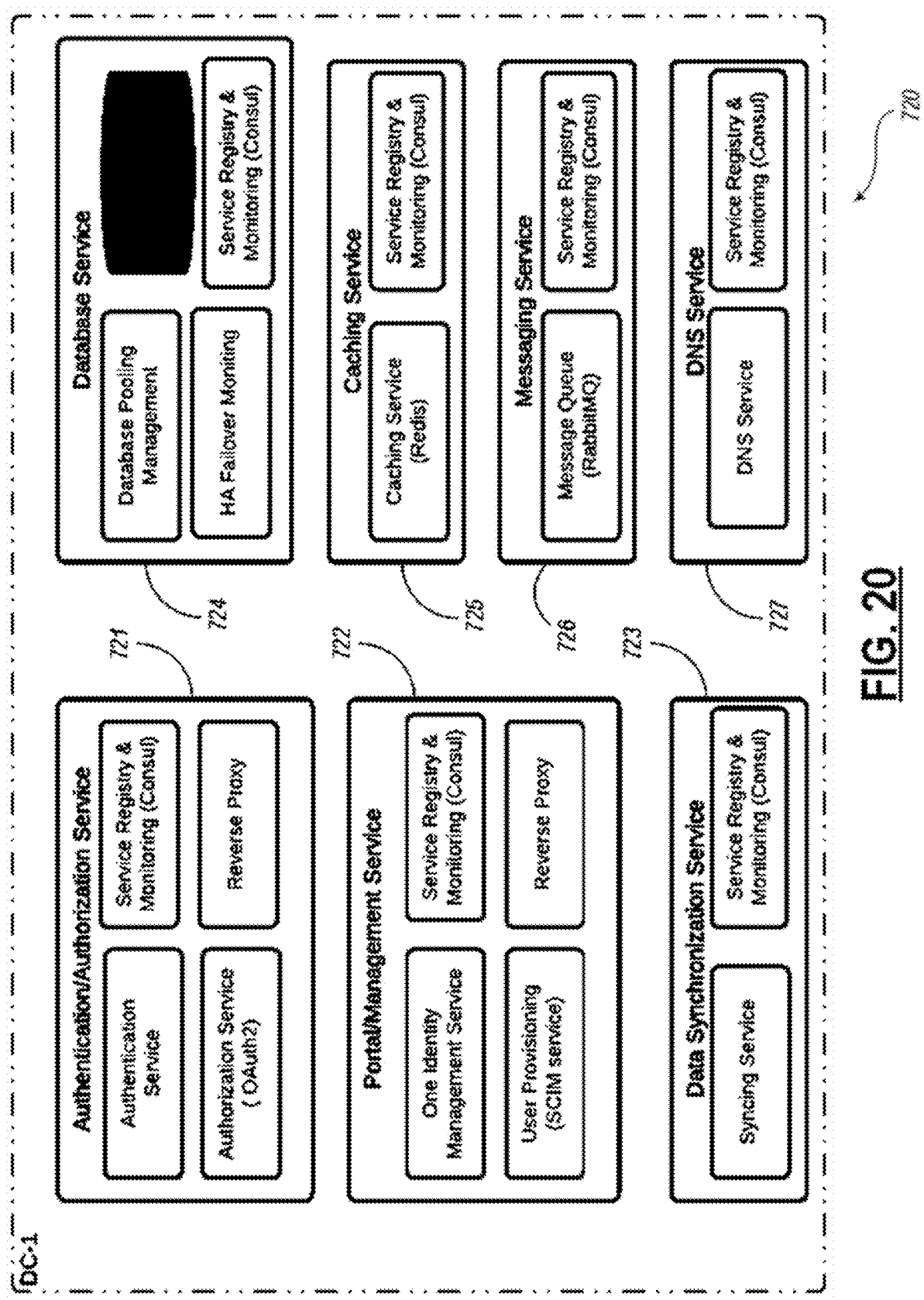
FIG. 20 is a diagram illustrating an embodiment of a node in a possible node deployment.

FIG. 20 is a diagram illustrating an embodiment of a node 720 in a possible node deployment. As illustrated, the node 720 may be deployed with an authentication/authorization service 721, a portal/management service 722, a data synchronization service 723, a database service 724, a caching service 725, a messaging service 726, and a Domain Name System (DNS) service 727.

Figure 21:
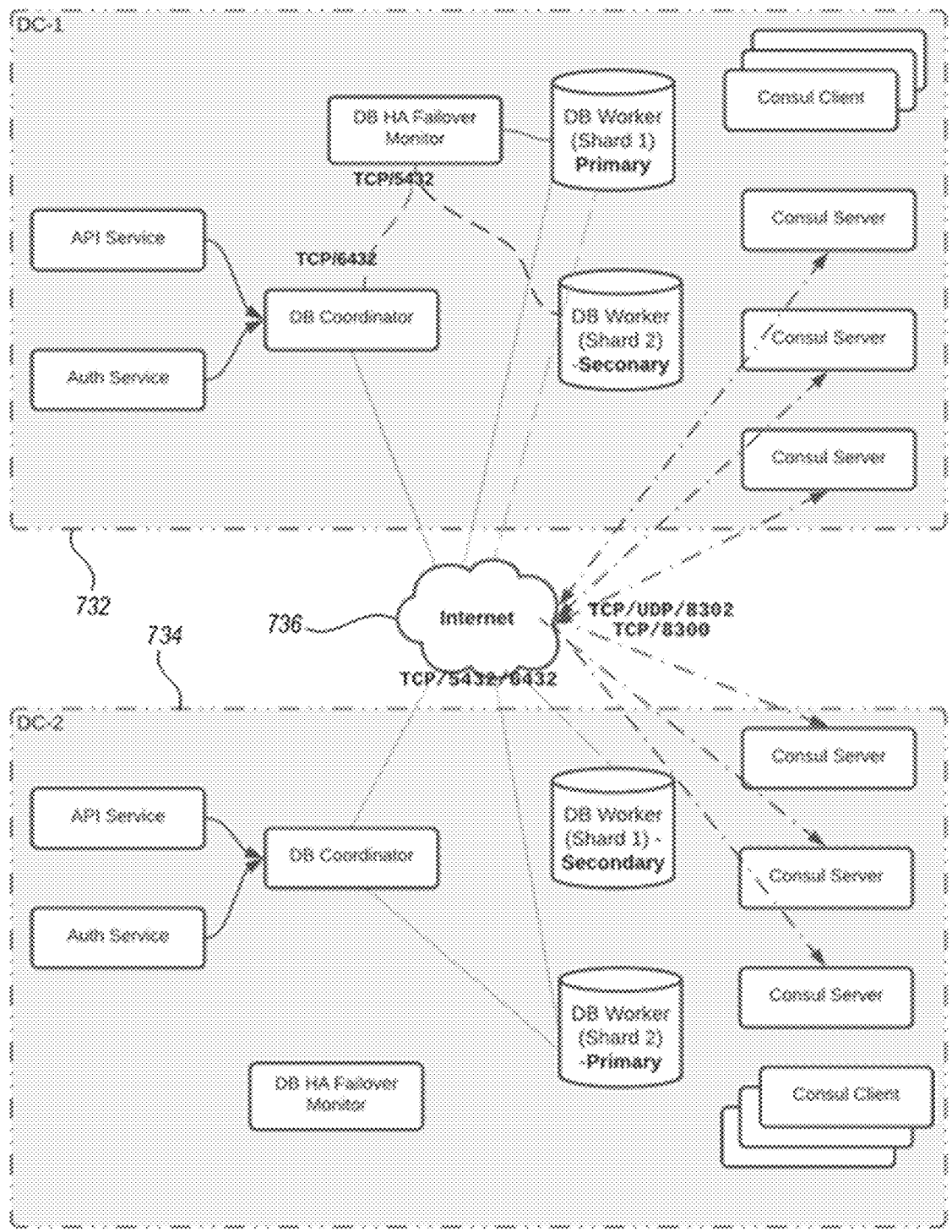
FIG. 21 is a network diagram illustrating an embodiment of a cross-domain system between a first data center and a second data center, which may be configured to communicate with each other via the Internet.

FIG. 21 is a network diagram illustrating an embodiment of a cross-domain system 730 between a first data center 732 and a second data center 734, which may be configured to communicate with each other via the Internet 736. Each data center 732, 734, may include the API service, authentication service, database (DB) coordinator, DB High Availability (HA) failover monitor, primary and secondary DB workers (Shard 1 and Shard 2), "consul" servers (e.g., service registry monitoring system 710 of FIG. 19), and consul clients.

Figure 22:
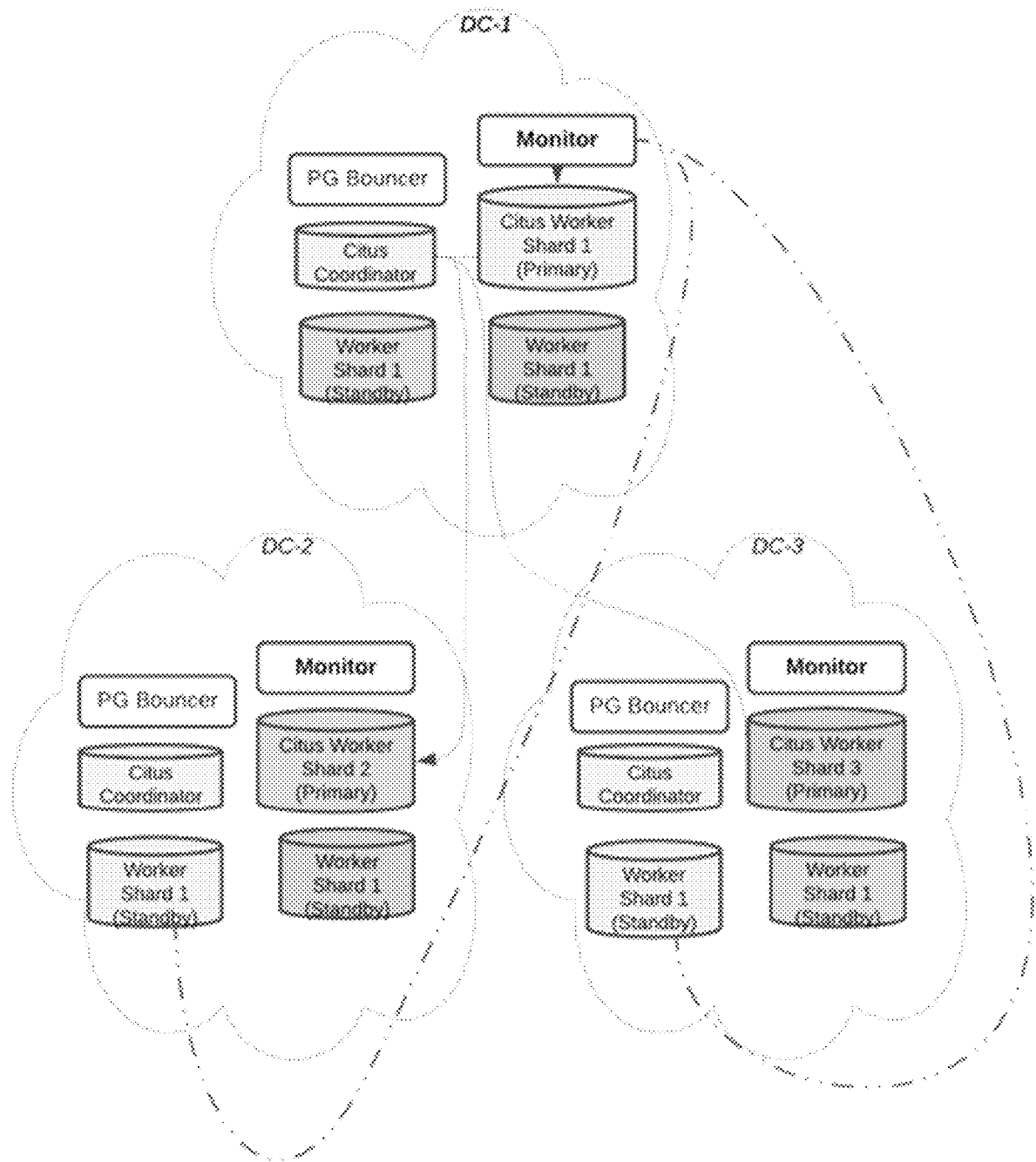
FIG. 22 is a network diagram illustrating an embodiment of a cross-domain system among multiple data centers.
Figure 23:
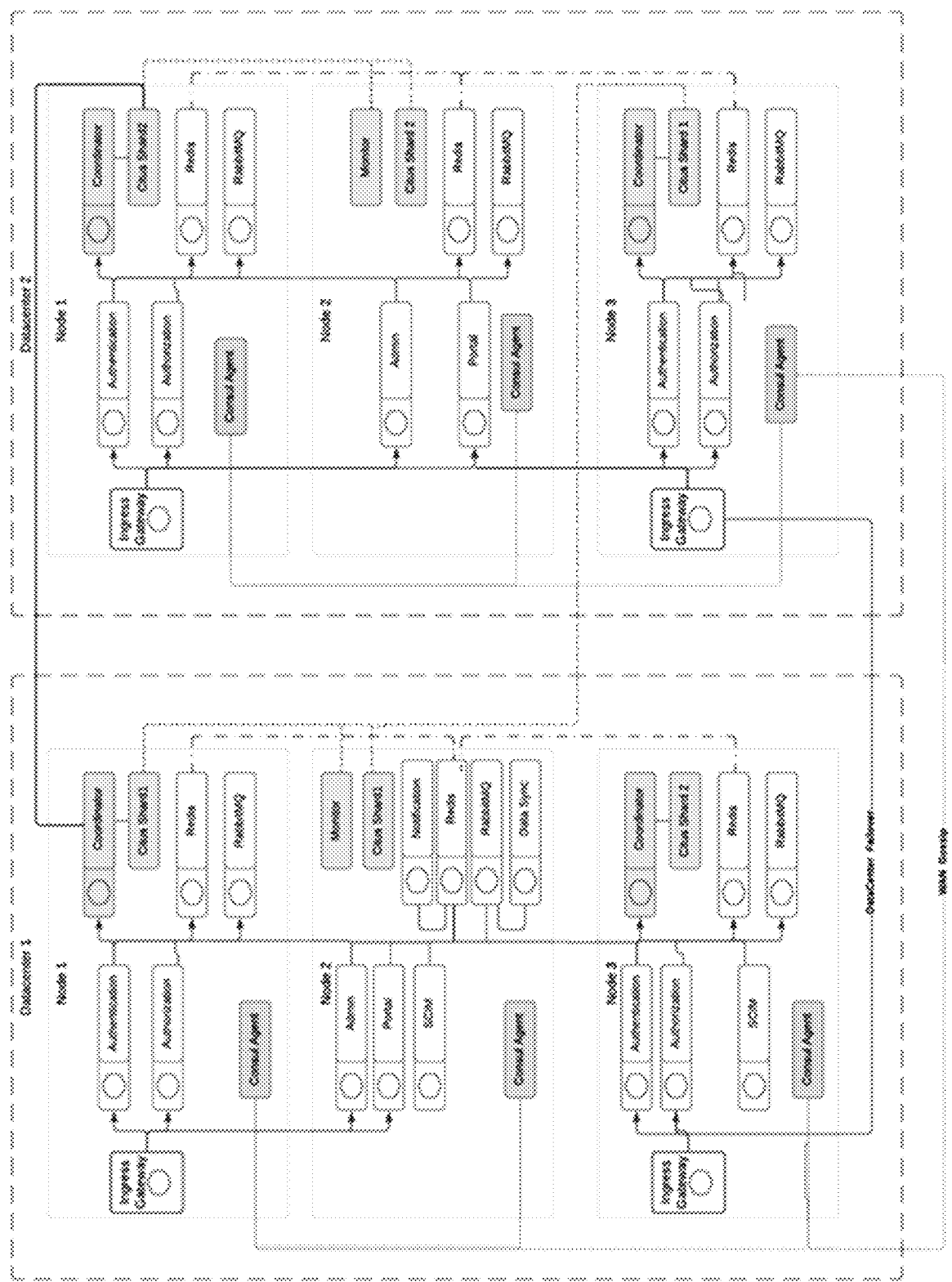
FIG. 23 is a network diagram illustrating an embodiment of a cross-domain system, where each data center includes multiple nodes.

FIG. 22 is a network diagram illustrating an embodiment of a cross-domain system 740 among multiple data centers. In this embodiment, each domain or data center (DC) may include PostgresQL components. FIG. 23 is a network diagram illustrating an embodiment of a cross-domain system 750, where each data center includes multiple nodes.

The One Identity (e.g., OneID) systems and methods may be part of the IdP 552 or other server for providing unified identity services as explained with respect to FIGS. 9-22. In summary, the OneID platform may include at least one or more of the following services:

1) One Identity Operational Portal (opsadmin)
2) One Identity Admin Management (admin)
3) One Identity Portal (portal)
4) One Identity Authentication (authn & authz)
5) One Identity SCIM (scim)
6) One Identity DataSync (datasync)
7) One Identity Job Scheduler (jobsched)
8) One Identity Cache Notification (cachenotify)

It should be noted that the systems and methods described above with respect to FIGS. 9-22 with respect to unified identity may be implemented in a number of different ways. Also, it should also be noted that the unified identity systems and methods may be implemented in any suitable combinations of hardware and software components and deployed in the cloud-based system 100 or other parts of a communication network or system.

Furthermore, additional details of user interfaces (UIs), dashboards, etc. (e.g., as shown in U.S. Provisional Application 63/508,058) can be included in any suitable form and may include other designs, formats, etc. as may be conceived by one having an understanding of the present disclosure. As such, any suitable UIs for OneID may be designed for use by network administrators (admin) for a data center, enterprise, company, organization, etc., and/or may be designed for use by an end-user. The admin pages may be used for setting up organizations, setting up user accounts, setting up groups of users, etc. The set-up processes may include entering identity-relation information that can be used for verification, authentication, authorization, etc. by OneID and/or other associated services that rely on identity. As mentioned above (e.g., see FIG. 9), the unified identity services can then be used as a centralized hub for enabling the authentication of identity before one or more other services (e.g., ZIA, ZPA, ZDX, ZSCM, ZCC, etc.) may be put into use. Thus, the unified identity hub may be referred to as a Single Sign-On (SSO) type of centralized system that can control ID-related services for any or all other network security or trust services. The unified identity systems and methods may branch out to other security services provided by the same vendor, or, in other embodiments, may be configured to work with security services provided by one or more other vendors.

The UI pages (along with the associated functionalities) may include, for example, login pages for admin, admin portals, functionalities for adding tenants (e.g., organizations, companies, enterprises, users, user devices, groups of users, etc.), onboarding tenants, viewing tenant information, editing tenant information, deleting tenants, editing user groups, searching names of organization or tenants, integrating identity functions with various services, accessing directories, viewing security information, account management, editing admin profiles, cloud configuration, admin controls, adding or editing applications or services, adding or editing sign-in policies, adding or editing password policies, enforcing policies, security management, creating and editing IP locations and location groups, view audit logs, control UIs, controlling authentication and authorization services, controlling password information, data syncing, schedule jobs and tasks, provide notifications, SAML assertion, configuring and integrating services, admin management, handling Client Connector (CC) information, managing and configuring APIs, service deployment, upgrading services, coordinating maintenance on services, etc.

Figure 24:
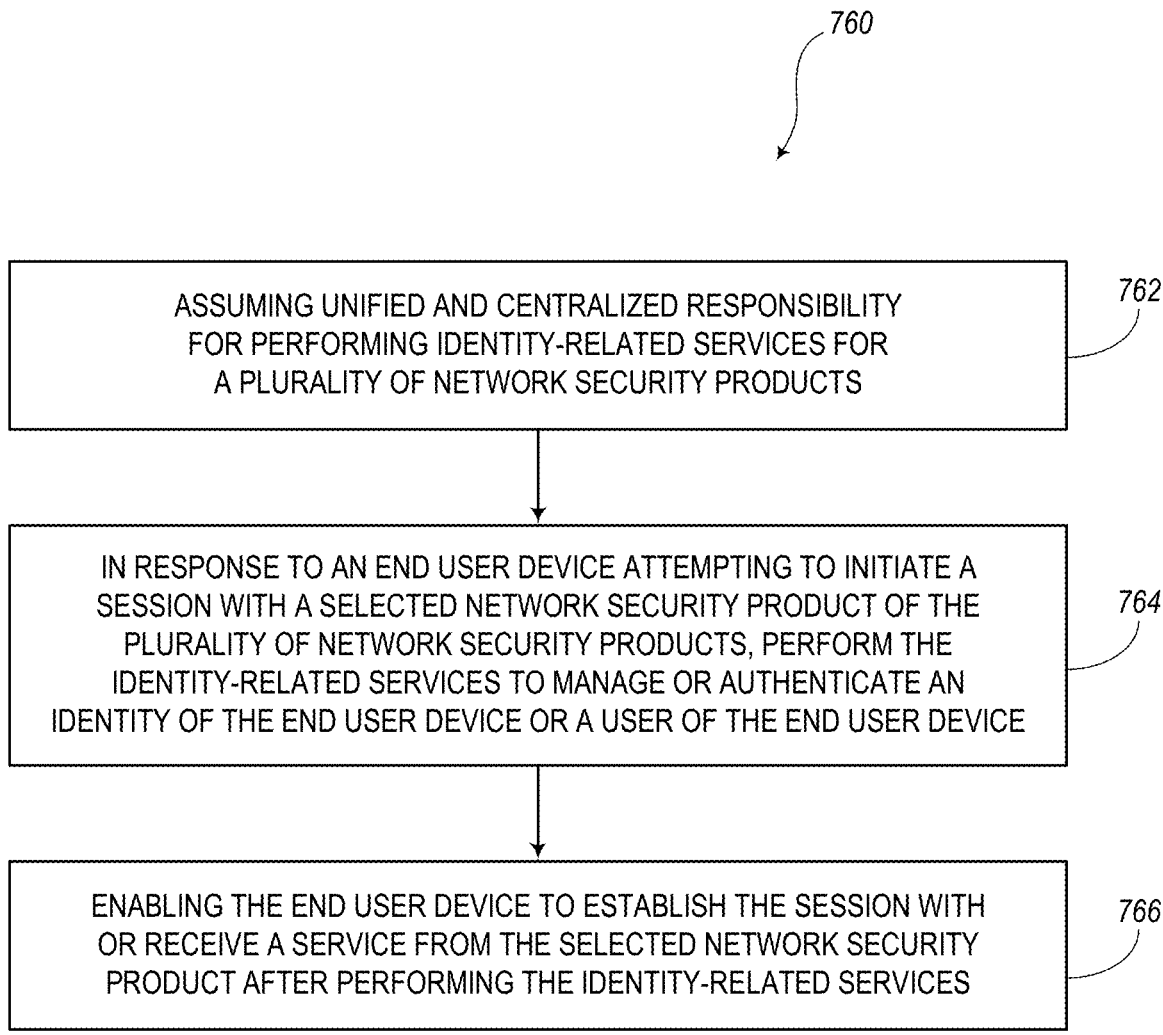
FIG. 24 is a flow diagram illustrating a method for executing a unified identification procedure.

FIG. 24 is a flow diagram illustrating a method 760 for executing a unified identification procedure. As illustrated in this embodiment, the method 760 includes the step of assuming unified and centralized responsibility for performing identity-related services for a plurality of network security products, as indicated in block 762. In response to an end user device attempting to initiate a session with a selected network security product of the plurality of network security products, the method 760 further includes the step of performing the identity-related services to manage or authenticate an identity of the end user device or a user of the end user device, as indicated in block 764. Also, the method 760 includes the step of enabling the end user device to establish the session with or receive a service from the selected network security product after performing the identity-related services, as indicated in block 766. In some embodiments, the method 760 may be incorporated in the programs 216 of the server 200 (FIG. 3) and may be implemented in non-transitory computer-readable media. Also, the method 760 may be incorporated in an IdP system, such as the IdP 552 shown in FIG. 9.

In some implementations of the method 760, by assuming unified and centralized responsibility for performing the identity-related services for the plurality of network security products (block 762), the method 760 can avoid duplication of the identity-related services by the plurality of network security products. When implemented in an IdP system (e.g., IdP 552), the IdP system may be related to a cloud-based system (e.g., cloud-based system 100) oriented between the end user device and the Internet. The method 760 may further include the step of instituting a Single Sign-On (SSO) procedure for accessing the plurality of network security products, wherein the SSO may be associated with a single portal or User Interface (UI) of the server 200 or IdP 552 allowing a user to navigate the plurality of network security products.

The step of managing or authenticating the identity of the end user device or user (block 764) may include support of authentication processes associated with one or more of Security Assertion Markup Language (SAML), OAuth 1.0, OAuth 2.0, and OpenID Connect, a System for Cross-domain Identity Management (SCIM), a system that spans multiple data centers, a Lightweight Directory Access Protocol (LDAP), an Active Directory (AD), and an authentication bridge service.

The method 760, in some embodiments, may include the use of one or more of a metadata manager, an organization configuration manager, a provisioning manager, and a notification manager. Also, the method 760 may utilize a database configured to store or log ID information related to one or more user IDs, device IDs, and authentication attempts. The method 760 may also include the use of an inbound authentication unit, an authentication manager, and an outbound federated authentication unit, which may be configured in combination to perform the identity-related services. In addition, the method 760 may further use an inbound provisioning unit, a provisioning manager, and an outbound provisioning unit, which may be configured in combination to manage identity-related messaging with the plurality of network security products.

In some embodiments of the present disclosure, the method 760 may additionally include the step of allowing a server to act as a Certificate Authority and perform a task of synchronizing a mobile portal to an ID store. The method 760 may also be configured to perform the step of protecting applications associated with a Cloud Access Security Broker (CASB).

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. An Identity Provider (IdP) system comprising:
a processing device, and
a memory device configured to store a computer program having instructions that, when executed, enable the processing device to
assume unified and centralized responsibility for performing identity-related services for a plurality of network security products;
in response to an end user device attempting to initiate a session with a selected network security product of the plurality of network security products, perform the identity-related services to manage or authenticate an identity of the end user device or a user of the end user device, wherein the IdP system comprises a centralized identity platform configured to execute an authentication process that provides centralized enhancements to identity-related functionalities, wherein the centralized enhancements made within the IdP system are automatically and simultaneously propagated to each of the plurality of network security products, thereby ensuring standardized identity-related configurations, uniform authentication behaviors, and a consistent user experience across all of the plurality of network security products; and
enable the end user device to establish the session with or receive a service from the selected network security product after performing the identity-related services.

2. The IdP system of claim 1, wherein, by assuming unified and centralized responsibility for performing the identity-related services for the plurality of network security products, the IdP system avoids duplication of the identity-related services by the plurality of network security products.

3. The IdP system of claim 1, wherein the IdP system is related to a cloud-based system oriented between the end user device and the Internet.

4. The IdP system of claim 1, wherein the instructions further enable the processing device to institute a Single Sign-On (SSO) procedure for accessing the plurality of network security products.

5. The IdP system of claim 1, wherein managing or authenticating the identity of the end user device or user includes support of authentication processes associated with one or more of Security Assertion Markup Language (SAML), OAuth 1.0, OAuth 2.0, and OpenID Connect.

6. The IdP system of claim 1, wherein managing or authenticating the identity of the end user device or user includes support of authentication processes associated with one or more of a System for Cross-domain Identity Management (SCIM), a system that spans multiple data centers, a Lightweight Directory Access Protocol (LDAP), an Active Directory (AD), and an authentication bridge service.

7. The IdP system of claim 1, further comprising one or more of a metadata manager, an organization configuration manager, a provisioning manager, and a notification manager.

8. The IdP system of claim 1, further comprising a database configured to store or log ID information related to one or more user IDs, device IDs, and authentication attempts.

9. The IdP system of claim 1, further comprising an inbound authentication unit, an authentication manager, and an outbound federated authentication unit configured in combination to perform the identity-related services.

10. The IdP system of claim 1, further comprising an inbound provisioning unit, a provisioning manager, and an outbound provisioning unit configured in combination to manage identity-related messaging with the plurality of network security products.

11. The IdP system of claim 1, wherein the instructions further enable the processing device to act as a Certificate Authority and sync a mobile portal to an ID store.

12. The IdP system of claim 1, wherein the instructions further enable the processing device to protect applications associated with a Cloud Access Security Broker (CASB).

13. The IdP system of claim 1, further comprising a single portal or User Interface (UI) allowing a user to navigate the plurality of network security products.

14. A non-transitory computer-readable storage medium configured to store computer logic having instructions that, when executed, cause one or more processing devices to:
assume unified and centralized responsibility for performing identity-related services for a plurality of network security products;
in response to an end user device attempting to initiate a session with a selected network security product of the plurality of network security products, perform the identity-related services to manage or authenticate an identity of the end user device or a user of the end user device, wherein the one or more processing devices comprise a centralized identity platform configured to execute an authentication process that provides centralized enhancements to identity-related functionalities, wherein the centralized enhancements made within the IdP system are automatically and simultaneously propagated to each of the plurality of network security products, thereby ensuring standardized identity-related configurations, uniform authentication behaviors, and a consistent user experience across all of the plurality of network security products; and
enable the end user device to establish the session with or receive a service from the selected network security product after performing the identity-related services.

15. The non-transitory computer-readable storage medium of claim 14, wherein, by assuming unified and centralized responsibility for performing the identity-related services for the plurality of network security products, duplication of the identity-related services by the plurality of network security products is avoided.

16. The non-transitory computer-readable storage medium of claim 14, further comprising a single portal or User Interface (UI) allowing a user to navigate the plurality of network security products, wherein the instructions further cause the one or more processing devices to use the single portal or UI to institute a Single Sign-On (SSO) procedure for accessing the plurality of network security products.

17. The non-transitory computer-readable storage medium of claim 14, wherein managing or authenticating the identity of the end user device or user includes support of authentication processes associated with one or more of Security Assertion Markup Language (SAML), OAuth 1.0, OAuth 2.0, OpenID Connect, a System for Cross-domain Identity Management (SCIM), a system that spans multiple data centers, a Lightweight Directory Access Protocol (LDAP), an Active Directory (AD), and an authentication bridge service.

18. A method comprising steps of:
assuming unified and centralized responsibility for performing identity-related services for a plurality of network security products;
in response to an end user device attempting to initiate a session with a selected network security product of the plurality of network security products, performing the identity-related services to manage or authenticate an identity of the end user device or a user of the end user device, wherein the steps are performed in a centralized identity platform configured to execute an authentication process that provides centralized enhancements to identity-related functionalities, wherein the centralized enhancements made within the IdP system are automatically and simultaneously propagated to each of the plurality of network security products, thereby ensuring standardized identity-related configurations, uniform authentication behaviors, and a consistent user experience across all of the plurality of network security products; and enabling the end user device to establish the session with or receive a service from the selected network security product after performing the identity-related services.

19. The method of claim 18, further comprising a step of utilizing one or more of a metadata manager, an organization configuration manager, a provisioning manager, and a notification manager.

20. The method of claim 18, further comprising a step of:

performing the identity-related services using one or more of an inbound authentication unit, an authentication manager, and an outbound federated authentication unit; and managing identity-related messaging with the plurality of network security products using one or more of an inbound provisioning unit, a provisioning manager, and an outbound provisioning unit.

* * * * *